US012746531B2

(12) United States Patent
Mazzoccoli et al.

(10) Patent No.: US 12,746,531 B2
(45) Date of Patent: Sep. 29, 2026

(54) METHOD OF CHARACTERIZING A SORBENT

(71) Applicant: CALGON CARBON CORPORATION, Moon Township, PA (US)

(72) Inventors: Jason Paul Mazzoccoli, Pittsburgh, PA (US); Christopher Bennett Dixon, Pittsburgh, PA (US); Timothy Robert McClelland, Pittsburgh, PA (US); Ryan William Walker, Pittsburgh, PA (US)

(73) Assignee: CALGON CARBON CORPORATION, Moon Township, PA (US)

(*) Notice: Subject to any disclaimer, the term of this patent is extended or adjusted under 35 U.S.C. 154(b) by 461 days.

(21) Appl. No.: 18/532,153

(22) Filed: Dec. 7, 2023

(65) Prior Publication Data

US 2024/0189796 A1 Jun. 13, 2024

Related U.S. Application Data

(60) Provisional application No. 63/386,381, filed on Dec. 7, 2022.

(51) Int. Cl.

*B01J 20/281* (2006.01)
*B01J 20/20* (2006.01)
*B01J 20/30* (2006.01)
*G01N 30/00* (2006.01)

(52) U.S. Cl.

CPC ............ *B01J 20/281* (2013.01); *B01J 20/20* (2013.01); *B01J 20/3078* (2013.01); *G01N 30/00* (2013.01)

(58) Field of Classification Search

CPC ...... B01J 20/28; B01J 20/281; B01J 20/3078; C02F 1/281

See application file for complete search history.

(56) References Cited

U.S. PATENT DOCUMENTS

2015/0181832 A1 7/2015 Lipscomb

FOREIGN PATENT DOCUMENTS

TH 1501001143 A 8/2021

OTHER PUBLICATIONS

Aguinaldo, Jorge T. Precipitative Softening and Ultrafiltration Treatment of Beverage Water. Diss. University of South Florida, 2006.*

Ahmad, "Development of Functionalized Date Pits Adsorbent for the Removal of Boron, Lithium, and Molybdenum from Groundwater in the State of Qatar", Qatar University Digital Hub, Jun. 2021, 50 pages.

Caplan et al., "Hydrometallurgical Leaching of Copper Flash Furnace Electrostatic Precipitator Dust for the Separation of Copper from Bismuth and Arsenic"; Metals, Feb. 23, 2021, vol. 11(371):1-18.

(Continued)

*Primary Examiner* — Richard M Rump

(74) *Attorney, Agent, or Firm* — DLA Piper LLP (US)

(57) ABSTRACT

There is provided a method to characterize a sorbent. The method may provide a sorbent, suspend the sorbent in a fluid, stir the sorbent in the fluid, filter the sorbent from the fluid to isolate a filtrate, measure the electrical conductivity of the filtrate, and measure the alkalinity of the filtrate.

11 Claims, 8 Drawing Sheets

(56) References Cited

OTHER PUBLICATIONS

Liu et al., "Removal of fluoride and hardness by layered double hydroxides: property and mechanism", International Journal of Environmental Science and Technology, Jul. 6, 2019, vol. 17:673-682.

Sharp et al., "Interpreting measurements of total alkalinity in marine and estuarine waters in the presence of proton- binding organic matter", Deep Sea Research Part I, Jul. 29, 2020, vol. 165:1-19.

Somridhivej, "Investigation of Several Factors Affecting Total Alkalinity Concentration and Its Measurement", Auburn University, Dec. 12, 2015, 48 pages.

* cited by examiner

METHOD OF CHARACTERIZING A SORBENT

CROSS-REFERENCE TO RELATED APPLICATIONS

This application claims the benefit of U.S. Provisional Application No. 63/386,381 filed on Dec. 7, 2022, which is hereby incorporated by reference in its entirety.

FIELD

The present disclosure relates generally to methods for characterizing sorbents. More specifically, the present disclosure relates to methods for determining electrical conductivity, alkalinity, and ion concentration of sorbents.

BACKGROUND

High-temperature calcination processing results in changes to an activated carbon surface that includes the removal of adsorbed water, the removal of surface oxygen and other acidic groups, and perhaps the imparting of basic moieties that result in an increase in the activated carbon's alkalinity. These changes may be advantageous in certain applications like immersive cooling, where activated carbon is used to filter non-conductive liquids that are used in baths that remove heat from submersed computing equipment. By removing acidic moieties such as surface oxygen groups and reducing moisture content from the activated carbon, it is believed that secondary reactions between the activated carbon surface and chemical components including the cooling fluid, such as ketones, are reduced. A reduction of these undesirable reactions should, without wishing to be bound by theory, minimize the production of harmful byproducts that can damage the sensitive and valuable electronics immersed in the bath. The work described herein provides new simple experimental approaches that track the impact of the calcination process on activated carbon to ensure a consistent product is being generated at production scale, while likely providing insights into physical changes to the activated carbon itself.

As client computing demands and datacenter density continue to increase, heat dissipation requirements of electronic components, such as microprocessors, chipsets, graphics processing units (GPUs), and memory modules are also rising. Conventional client computing devices and data centers are air cooled, frequently by way of heatsinks, cooling fins, and fans that move cool air to the electronic components and which remove waste heat by conduction and convection. Such devices and techniques have drawbacks. While air is electrically insulating and non-corrosive, its high volume for a given thermal capacity means that moving cool air to electronic components, removing heated exhaust, cooling the heated exhaust (frequently by air conditioning), and recirculating as cool air is mechanically energy intensive.

In contrast, immersion cooling envelops electronic components in a thermally conductive but electrically insulating (dielectric) coolant. Waste heat is thereby removed from the electronic components by the coolant by transferring the heat from the electronic components to the coolant. The now-heated coolant thereafter proceeds to a heat exchanger, where it is cooled by coming in proximity to another fluid, such as air or water. The coolants are electrically insulating to ensure that they can safely come into contact with leads, traces, surface mount pads, solders, and other electronic components that are exposed and energized during normal operation.

In general, an immersion cooling system includes the electronic device to be cooled submerged in the coolant. Over time, various material components of the electronic device may leech out into the coolants. While the coolant itself is electrically insulating, metals from solder and metal electronic components as well as hydrocarbon oils found in elastomers, solder flux, resist materials, PVC insulation, foams, adhesives and reaction products thereof with the coolant introduce contaminants that may increase the electrical conductivity of the coolant. As this is undesirable, these contaminants must be removed.

Presently, filtration systems exist for immersion cooling systems: however, the materials used require a large amount of sorbent and the filter to be replaced with a prohibitive frequency. For example, generally a sorbent is provided in an enclosure in an amount that is about five times the mass of anticipated contamination in the coolant. Optimization of the sorbent material, particularly to increase efficiency and adsorbent capacity of a sorbent material in a filter would represent an advancement in the industry that would reduce the cost associated with immersion cooling, both in reduced need for sorbent replacement, but also effecting improved efficiency using coolants with a higher purity. Such a sorbent would additionally not introduce contamination to the coolant itself.

SUMMARY

In some aspects, the techniques described herein relate to a method of characterizing a sorbent, including: providing a sorbent, suspending the sorbent in a fluid, stirring the sorbent in the fluid, filtering the sorbent from the fluid to isolate a filtrate, measuring the electrical conductivity of the filtrate, and measuring the alkalinity of the filtrate.

In some aspects, the techniques described herein relate to a method, wherein the fluid is deionized water.

In some aspects, the techniques described herein relate to a method, wherein stirring the sorbent is conducted for a time for about 1 hour to about 24 hours.

In some aspects, the techniques described herein relate to a method, wherein measuring the alkalinity of the filtrate includes: providing a sample of the filtrate, performing a first titration on the sample using a first acid and a first indicator to a first endpoint pH to provide a first alkalinity measurement, performing a second titration on the sample using a second acid and a second indicator to a second endpoint pH to provide a second alkalinity measurement, and calculating a total alkalinity of the sample.

In some aspects, the techniques described herein relate to a method, wherein the first acid and the second acid include sulfuric acid.

In some aspects, the techniques described herein relate to a method, wherein the first indicator includes phenolphthalein.

In some aspects, the techniques described herein relate to a method, wherein the first endpoint pH is about 7.5 to about 9.0.

In some aspects, the techniques described herein relate to a method, wherein the second indicator includes bromocresol green-methyl red.

In some aspects, the techniques described herein relate to a method, wherein the second endpoint pH is about 4.0 to about 5.0.

In some aspects, the techniques described herein relate to a method, wherein calculating the total alkalinity of the sample includes adding the first alkalinity measurement and the second alkalinity measurement.

In some aspects, the techniques described herein relate to a method, further including determining the concentration of carbonate ions, bicarbonate ions, and hydroxide ions in the filtrate.

In some aspects, the techniques described herein relate to a method, wherein the total alkalinity is substantially attributable to bicarbonate ions.

In some aspects, the techniques described herein relate to a method, wherein the total alkalinity is substantially attributable to hydroxide ions.

In some aspects, the techniques described herein relate to a method, wherein the total alkalinity is substantially attributable to carbonate ions.

In some aspects, the techniques described herein relate to a method, wherein the total alkalinity is substantially attributable to a combination of carbonate ions and bicarbonate ions.

In some aspects, the techniques described herein relate to a method, wherein the total alkalinity is substantially attributable to a combination of carbonate ions and hydroxide ions.

In some aspects, the techniques described herein relate to a method of purifying a coolant that contains one or more conductive contaminants, including: contacting the coolant with a sorbent to thereby cause the sorbent to adsorb the one or more conductive contaminants, wherein the sorbent has a filtrate alkalinity of about 10 mg/L $CaCO_3$ to about 60 mg/L $CaCO_3$ and a filtrate electrical conductivity of less than about 650 μS, wherein the sorbent includes activated carbon.

In some aspects, the techniques described herein relate to a method, wherein the sorbent has a filtrate alkalinity of about 30 mg/L $CaCO_3$ to about 50 mg/L $CaCO_3$.

In some aspects, the techniques described herein relate to a method, wherein the sorbent has a filtrate electrical conductivity of about 5 μS to about 200 μS.

In some aspects, the techniques described herein relate to a method, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material, or combinations thereof.

In some aspects, the techniques described herein relate to a composition for purifying a coolant that contains one or more conductive contaminants, the composition including: a sorbent that has a filtrate alkalinity of 10 mg/L $CaCO_3$ to about 60 mg/L $CaCO_3$ and a filtrate electrical conductivity of less than about 650 μS, wherein the sorbent includes activated carbon.

In some aspects, the techniques described herein relate to a method, wherein the sorbent has a filtrate alkalinity of about 30 mg/L $CaCO_3$ to about 50 mg/L $CaCO_3$.

In some aspects, the techniques described herein relate to a method, wherein the sorbent has a filtrate electrical conductivity of about 5 μS to about 200 μS.

In some aspects, the techniques described herein relate to a method, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material, or combinations thereof.

In some aspects, the techniques described herein relate to a method for making a sorbent for purifying a coolant that contains one or more conductive contaminants, including: providing a precursor sorbent material, and performing at least one treatment method on the precursor sorbent material to thereby form a sorbent that has a filtrate alkalinity of 10 mg/L $CaCO_3$ to about 60 mg/L $CaCO_3$ and a filtrate electrical conductivity of less than about 650 μS, wherein the sorbent includes activated carbon.

In some aspects, the techniques described herein relate to a method, wherein the precursor sorbent material is formed from one or more of one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material, or combinations thereof.

In some aspects, the techniques described herein relate to a method, wherein the at least one treatment method includes one or more of: calcining, drying, processing under vacuum, nitrogen, hydrogen, carbon monoxide, ammonia, methane, argon, or combinations thereof, microwave assisted thermal processing, impregnation with a metal or oxygen scavenger, or combinations thereof.

In some aspects, the techniques described herein relate to the method, wherein the sorbent has a filtrate alkalinity of about 30 mg/L $CaCO_3$ to about 50 mg/L $CaCO_3$.

In some aspects, the techniques described herein relate to a method, wherein the sorbent has a filtrate electrical conductivity of about 5 μS to about 200 μS.

DRAWINGS

Aspects, features, benefits, and advantages of the embodiments described herein will be apparent with regard to the following description, appended claims, and accompanying drawings where:

Figure 3:
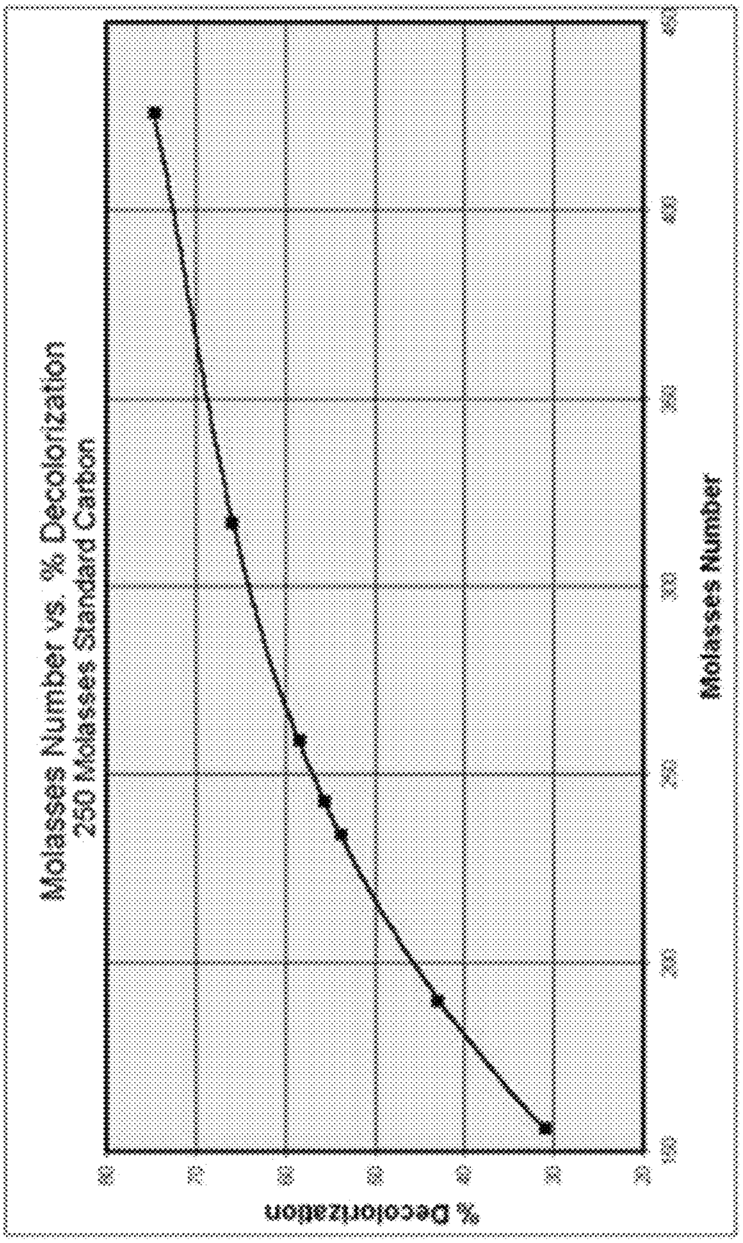

FIG. 3 plots the decolorization curve a sorbent material, which measures the relative amount of decolorization achieved versus the measured molasses number of the sorbent material.

Figure 4:
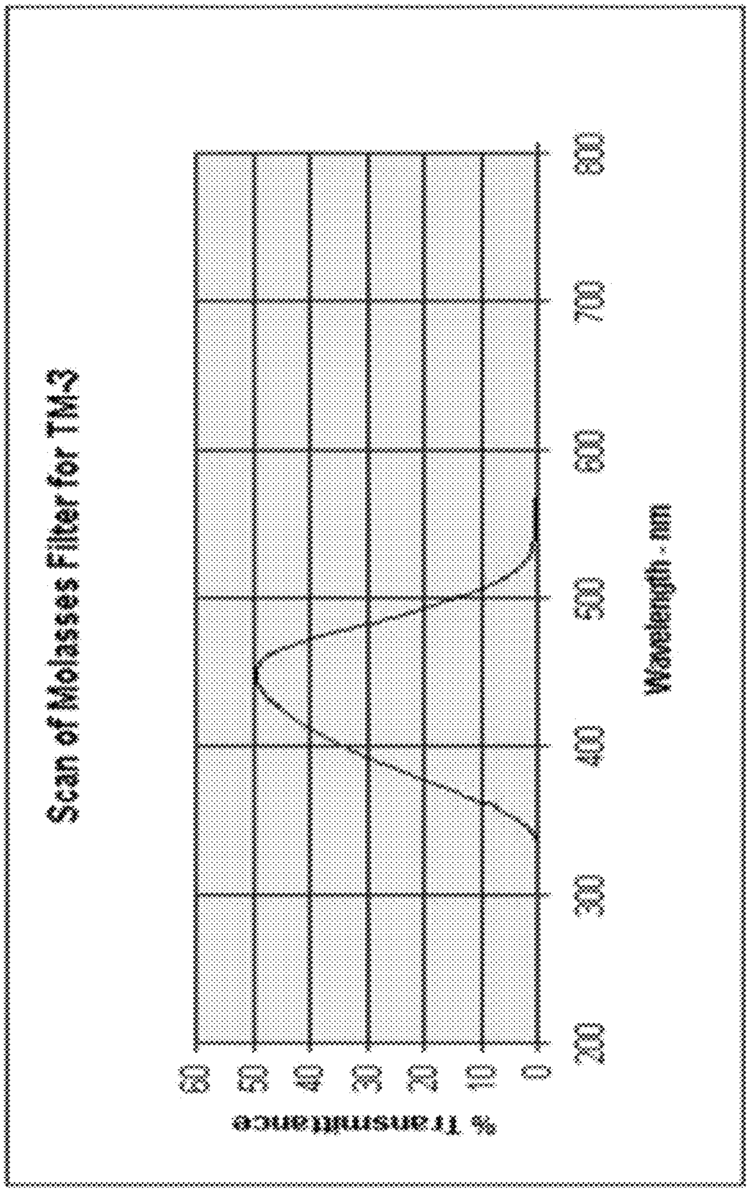

FIG. 4 depicts an example of a spectral scan, which depicts the transmittance of a molasses filter as a function of the wavelength of light.

Figure 5:
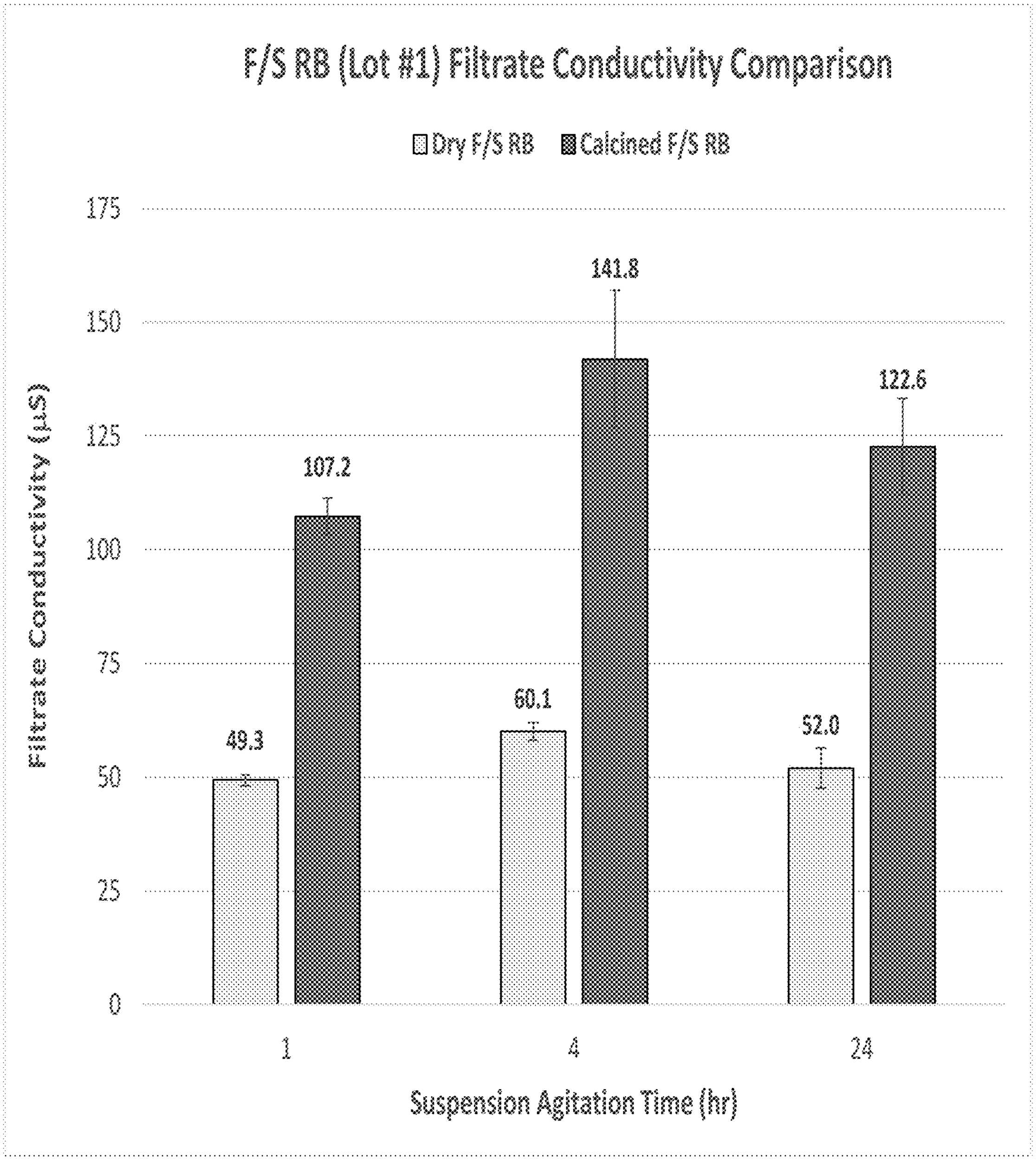

FIG. 5 is a bar graph of filtrate electrical conductivity of a first set of representative sorbent samples.

Figure 6:
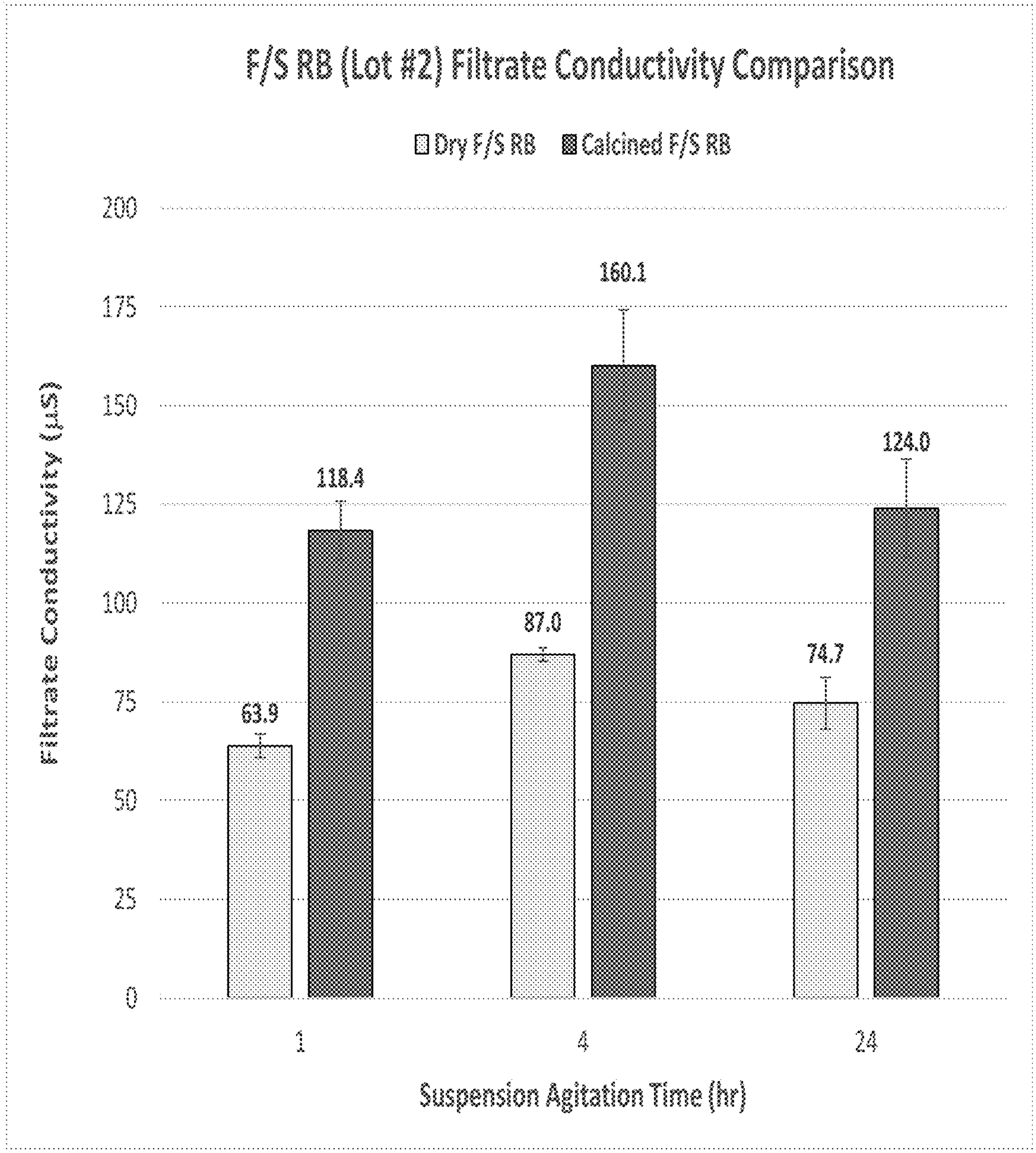

FIG. 6 is a bar graph of filtrate electrical conductivity of a second set of representative sorbent samples.

Figure 7:
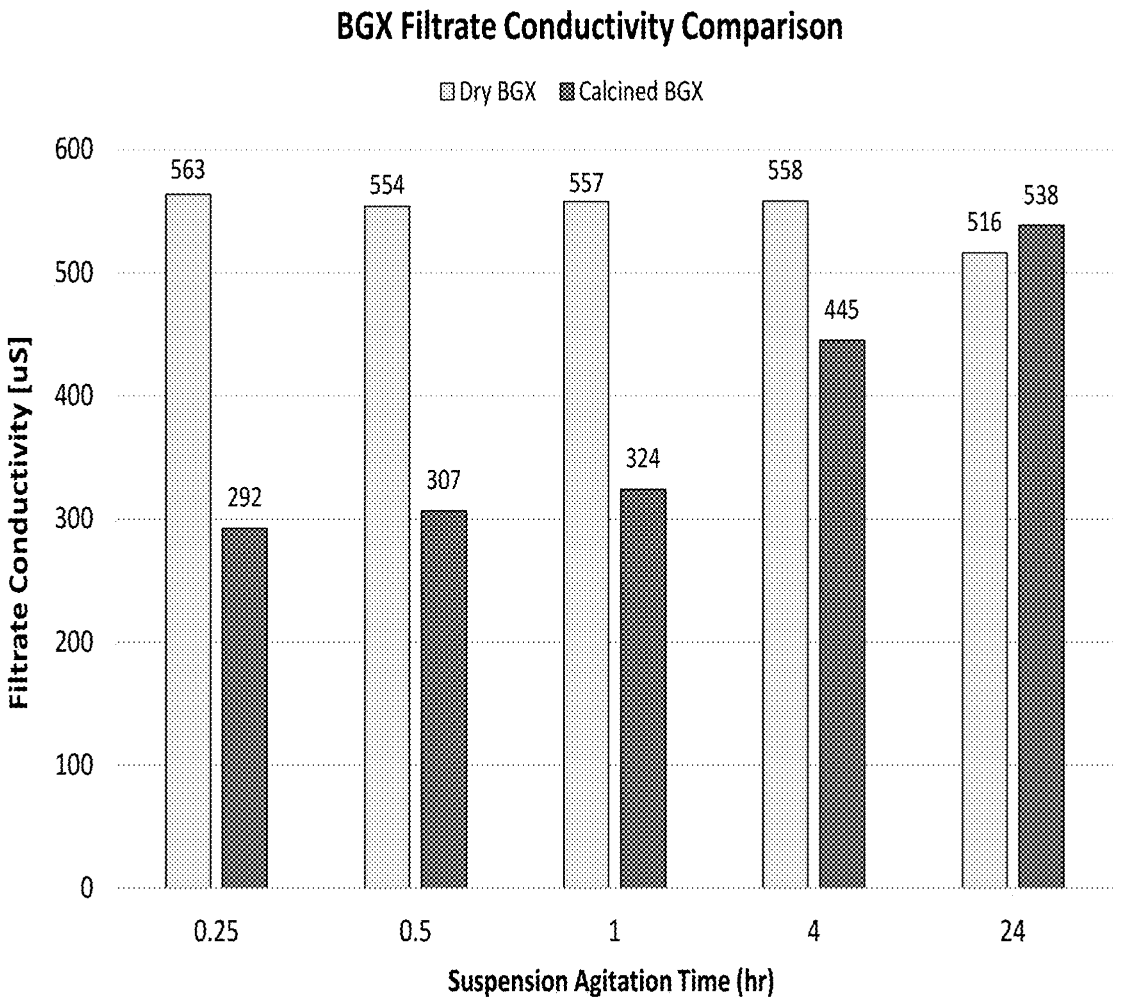

FIG. 7 is a bar graph of filtrate electrical conductivity of a third set of representative sorbent samples.

Figure 8:
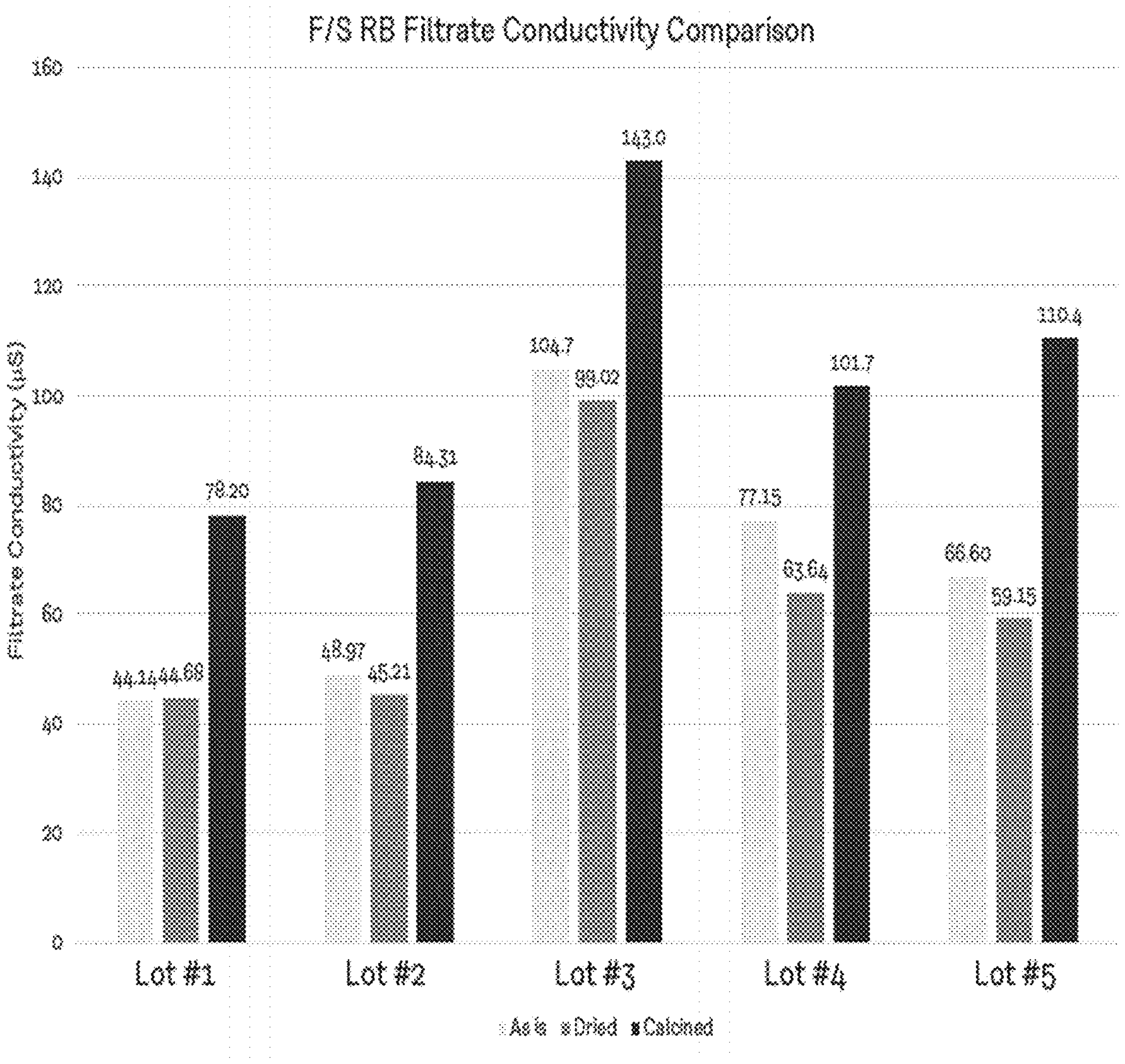

FIG. 8 is a bar graph showing the filtrate conductivity of five lots of either as is, dried, or calcined F/S RB materials agitated for 1 hour (Lot #1, Lot #2, Lot #3, Lot #4, and Lot #5).

DETAILED DESCRIPTION

Before the present compositions and methods are described, it is to be understood that the scope of the invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference with respect to the aspect it is identified as describing. Nothing herein is to be construed as an admission that the invention is not entitled to antedate such disclosure by virtue of prior invention.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. For example, "about 50%" means in the range of 45-55%.

As used herein, the terms "electronics rack" includes any housing, frame, rack, compartment, blade server system, or the like having one or more heat-generating components of a computer system, electronic system, or information technology equipment, and may be, for example, a standalone computer processor having high-, mid- or low-end processing capability. As used herein, "electronic component" refers to any heat generating electronic component of, for example, a computer system or other electronics unit requiring cooling. By way of example, an electronic component may include one or more integrated circuit dies and/or other electronic devices to be cooled, including one or more processor dies, memory dies or memory support dies. As used herein, "data center" refers to a computer installation containing one or more electronics racks to be cooled. As a specific example, a data center may include one or more rows of rack-mounted computing units, such as server units. A data center may include random access memory (RAM), one or more processing resources such as a central processing unit (CPU) or hardware or software control logic, ROM, and/or other types of nonvolatile memory. Additional components of the data center may include one or more disk drives, one or more network ports for communicating with external devices as well as various input and output (I/O) devices, such as a keyboard, a mouse, and a video display. The information handling system may also include one or more buses operable to transmit communications between the various hardware components.

As used herein, the term "sorbent material" means any material that exhibits adsorbent properties, absorbent properties, or a combination of adsorbent properties and absorbent properties. Adsorbent properties mean that atoms, ions, or molecules adhere to the surface of the material. Absorbent properties means that atoms, ions, or molecule enter and are retained by a bulk phase of the material. By way of example, sorbent materials include but are not limited to activated carbon, reactivated carbon, natural and synthetic zeolite, silica, silica gel, alumina, zirconia, and diatomaceous earths. As used herein, "sorbent material" is a material whose constituent components are substantially adsorbent and/or absorbent, with only minimal components that are not adsorbent and/or absorbent (for example, the minimal amount of binder that is required for activated carbon pellets to maintain their shape).

As used herein, the term "sorbent" means any composition or composite that includes a sorbent material in a blend, mixture, composite, or compound with one or more additional materials that do not exhibit adsorbent properties. By way of example, one embodiment of sorbent includes an activated carbon sorbent material mixed with a thermally conductive filler.

The sorbents described herein may be characterized by a variety of properties such as density, porosity, transport structure, gravimetric molasses number, gravimetric iodine number, volumetric iodine number, alkalinity, filtrate alkalinity, electrical conductivity, filtrate electrical conductivity, oxygen level, and mixture level. Standardized methods from ASTM International may be used to characterize many of these various properties. For example, pore (or void) volume may be determined using ASTM D4284-12(2017)e1 or an equivalent thereof. Pores may be characterized into three general size ranges. Micropores exhibit a pore diameter of less than about 2 nm. Mesopores range from 2 nm to 50 nm in diameter while macropores have a diameter greater than 50 nm. Particle size distribution may be determined according to ASTM D2862-16 or an equivalent thereof. Moisture content may be determined using ASTM D2867-17 or an equivalent thereof. Gravimetric iodine number may be determined using standard test method ASTM D4607-14 or an equivalent thereof. Volumetric iodine number may be calculated using the gravimetric number and apparent density, which may be determined using ASTM D2854-09 (2019) or an equivalent thereof.

As used herein, "gravimetric molasses number" means the determination of the decolorizing capacity of the sorbent or sorbent material in accordance with Calgon Carbon Method Number TM-3 entitled "Determination of the Molasses Number of Activated Carbon." The full test procedure is described fully herein. The gravimetric molasses number is reported as a unitless quantity measured per mass of sorbent or sorbent material.

The sorbent (and therefore, the enclosure and systems of which it is part) may be used to purify a coolant, for example, which has been contaminated during use. For example, one or more components of the data center construction materials (e.g., polymers, metals) may leech out and into the coolant. In another example, the coolant may react with one or more components of the construction material, producing reaction products that may contaminate the coolant. These contaminants may increase electrical conductivity of the coolant and therefore pose a risk to the operation of the electronic component/s. As such, systems may be implemented to remove such contaminants. As such, provided herein are assemblies of equipment and methods for their use in purifying a coolant, for example, for purifying a coolant in immersion cooling applications. Such assemblies and methods of use in purifying a coolant are further described in U.S. patent application Ser. No. 17/805,628, which is incorporated herein by reference in its entirety.

Figure 1:
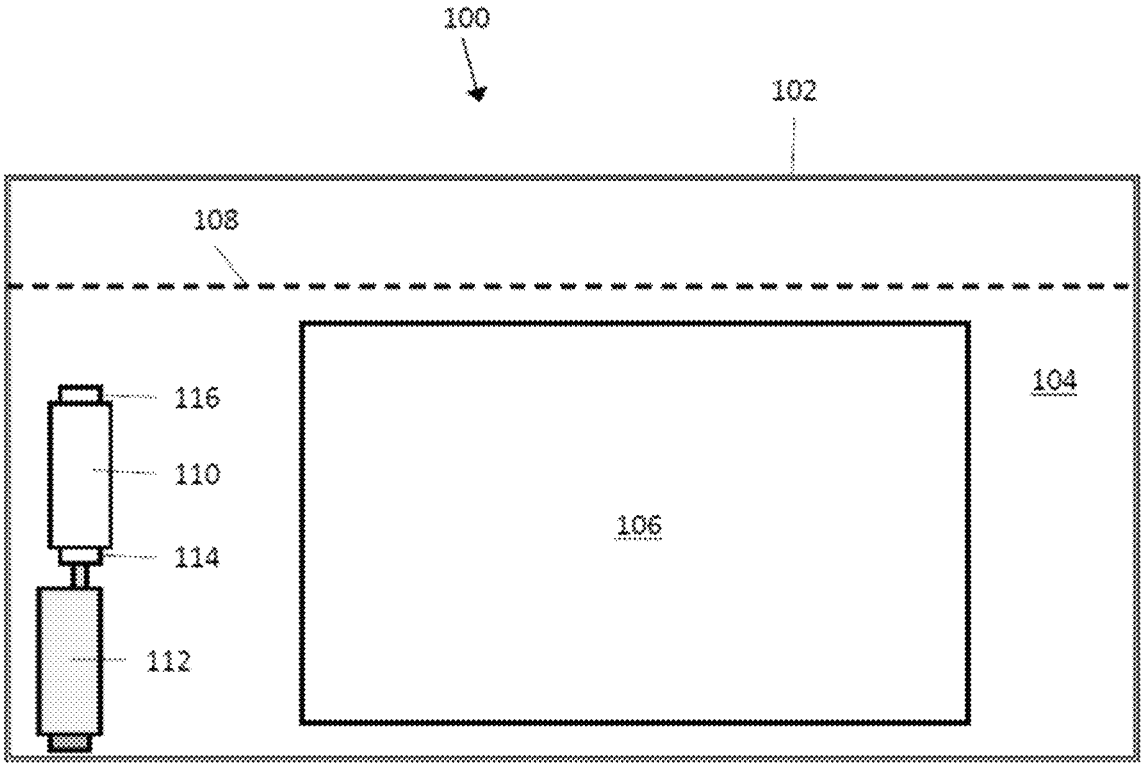
FIG. 1 depicts a schematic representation of an immersion cooling system in which a sorbent as disclosed herein may be used.

Such assemblies include a vessel configured to contain a coolant and a sorbent within an enclosure, the enclosure configured to contact the sorbent with the coolant. The assembly may be contained, for example, within a system for immersion cooling, such as an immersion cooling system for data centers or other electronic components that require cooling. As depicted in FIG. 1, such a system 100 may include a tank 102 filled with a volume of coolant 104, the electronic component/s 106, and the enclosure 110 including the sorbent.

Examples of suitable sorbents suitable in the methods and equipment assemblies disclosed herein include, but are not limited to, carbonaceous char, activated carbon, reactivated carbon, natural zeolite, synthetic zeolite, silica, silica clay, carbon nanotubes, and graphene. Preferably, the sorbent includes activated carbon, which will be used hereafter to exemplify various aspects of the method and equipment assemblies suitable for purifying a coolant. Any of the methods and equipment assemblies described herein below, however, may utilize any sorbent as listed above without deviating from the methods and systems contemplated and disclosed herein.

In any embodiment, the sorbent may include activated carbon. Activated carbon may be obtained from any known source, such as, but not limited to, bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material (e.g. extruded pellets), or any combination thereof. Commercially available sources of activated carbon include, but are not limited to, ACTICARBONE® activated carbons (available from Calgon Carbon Corporation), such as BGX, which is a granular grade of activated carbon derived from wood/vegetal sources and activated using phosphoric acid, RB (also from Calgon Carbon Corporation), which is activated carbon derived from coal sources, or activated carbon from Kuraray (e.g., Kuraray Coal™).

In any embodiment, sorbent (activated carbon or otherwise) may be provided in powdered, granular, or pellet form. For example, activated carbon may be provided in powdered form or in granular form, such as (but not limited to) re-agglomerated carbon powder, crushed granules generated from processing (e.g., crushing, pulverizing, or the like) those materials listed above. As used herein, granular activated carbon (GAC) refers to activated carbon particles sized to be retained on a 50-mesh sieve (holes of about 0.300 mm). As used herein, powdered activated carbon (PAC) refers to activated carbon particles that pass through an 80-mesh sieve (holes of about 0.180 mm).

Activated carbon may be formed by processes well known in the art, for example, by carbonization and activation or by direct activation. For example, raw material such as wood, nutshell, coal, pitch, or the like, may be oxidized and devolatilized with steam and/or carbon dioxide gasified to form pore structures in a carbonaceous material, thereby creating adsorption sites. Oxidation and devolatilization processes may include, for example, a chemical treatment with a dehydrating chemical, such as phosphoric acid, boric acid, sulfuric acid, sodium hydroxide, potassium hydroxide, or any combination thereof. In some embodiments, there is provided a method for making a sorbent for purifying a coolant that contains one or more conductive contaminants, which includes providing a precursor sorbent material, and performing at least one treatment method on the precursor sorbent material to thereby form a sorbent that has a filtrate alkalinity of 10 mg/L $CaCO_3$ to about 60 mg/L $CaCO_3$ and a filtrate electrical conductivity of less than about 650 μS, wherein the sorbent includes activated carbon. In some embodiments, the at least one treatment method includes calcining, drying, processing under vacuum, nitrogen, hydrogen, carbon monoxide, ammonia, methane, argon, or combinations thereof, microwave assisted thermal processing, impregnation with a metal or oxygen scavenger, or combinations thereof.

The performance of a sorbent in a liquid coolant may be improved when moisture and/or oxygen content of the sorbent is reduced. Therefore, a sorbent may be dried to remove moisture. Suitable drying methods include those known in the art, such as under vacuum or heating (e.g., in an oven), which may be carried out, for example, in air, under inert atmosphere, or vacuum at a temperature of up to about 105° C. to about 175° C. The sorbent may be calcined to remove surface oxygen groups. Calcination is a process well-known in the art and may be performed at a temperature of about 500° ° C. to about 1000° C. under an inert environment. In some embodiments, drying of the sorbent is omitted.

Sorbent material may be activated to a desired apparent density, molasses number, and iodine number by controlling steam injection rates, temperature, residence time, and content of the activating gas (e.g., steam, carbon dioxide, or the like). One of skill in the art will be able to determine suitable activation conditions and optimize as needed to provide a sorbent having the desired disclosed properties.

For example, a sorbent, such as activated carbon, suitable in the methods and systems disclosed herein may exhibit an apparent density of about 0.2 g/$cm^3$ to about 1 g/$cm^3$ such as about 0.3 g/$cm^3$ to about 0.7 g/$cm^3$, about 0.2 g/$cm^3$ to about 0.4 g/$cm^3$, or about 0.2 g/$cm^3$ to about 0.5 g/$cm^3$. Additionally or alternatively, a sorbent, such as activated carbon, may exhibit an iodine number of at least about 800 mg/g, such as about 800 mg/g to about 2000 mg/g, about 900 mg/g to about 1500 mg/g, or about 1000 mg/g to about 1500 mg/g. Suitable sorbent, such as activated carbon, may be characterized by a gravimetric molasses number of at least about 330, such as about 330-6000 or about 330 to about 900 (e.g., if coal-based) or about 1000 to about 6000 (e.g., if wood-based). Suitable sorbent, such as activated carbon, may also have a moisture content of less than about 15%, more preferably less than about 10%, less than about 2.5%, or about 0.6% to about 2.5%. Preferably, less than about 5 wt. % of the sorbent, regardless of source, has a particle diameter of 40 mesh (US) or 0.425 mm or less, as determined by ASTM D2862-16 (or an equivalent thereof). Suitable sorbent additionally may have an ash content not exceeding about 23 wt. %. Suitable sorbent may, for example, have an ash content of about 23% or less, such as about 20% or less, about 15% or less, about 10% or less, 5%, or about 3% or less. In some embodiments, there is provided a sorbent for purifying a coolant which contains one or more conductive contaminants, wherein the sorbent has a filtrate alkalinity of about 10 mg/L $CaCO_3$ to about 60 mg/L $CaCO_3$ (for example, about 10) mg/L $CaCO_3$, about 20 mg/L $CaCO_3$, about 30 mg/L $CaCO_3$, about 40 mg/L $CaCO_3$, about 50 mg/L $CaCO_3$, about 60 mg/L $CaCO_3$, or any range or value contained therein) and a filtrate electrical conductivity of less than about 650 μS, such as about 5 μS, about 10 μS, about 50 μS, about 100 μS, about 150 μS, about 200 μS, about 300 μS, about 400 μS, about 500 μS, about 600 μS, about 650 μS, or any range or value contained therein, and wherein the sorbent includes activated carbon. In some embodiments, the sorbent exhibits a combination of one or more of the properties described herein.

In any embodiment, a sorbent, such as activated carbon, may be treated to desorb or reacted (oxidized) surface products, the presence of which may be measured by any known method such as through X-ray photoelectron spectroscopy (XPS), thermogravimetric analysis (TGA), elemental analysis, temperature program desorption, temperature program desorption with mass spectrophotometry, Boehm Titration, water adsorption, moisture balance, or ascertaining mass differences of activated carbon pre- and post-drying, or any combination thereof.

For example, a sorbent may be provided after having been purged under nitrogen to remove oxygenated surface groups or moisture. Optionally, a sorbent may be packaged and provided in a vacuum-packed enclosure, which may be carried out, for example, according to the methods disclosed in U.S. Pat. No. 6,131,368 which is incorporated by reference herein in its entirety. For example, the sorbent may be warmed, then cooled under nitrogen within a gas-impermeable packaging material (e.g., a bag) to sufficiently create a vacuum within the packaging material, at which point the packaging material may be hermetically sealed. For example, in any embodiment where the sorbent includes activated carbon, carbonaceous material may be heated to about 500° ° C. to about 950° C. under an inert atmosphere, calcined for a desired amount of time, then cooled in an inert atmosphere to about 100° ° C., loaded into packaging material under the inert atmosphere, then further cooled and sealed, still under the inert atmosphere.

The present disclosure additionally provides a method for purifying a coolant with the sorbent as described above, the method including contacting the coolant with the sorbent under condition effective to transfer a contaminant in the coolant to the sorbent, for example, by absorption or adsorption. Examples of suitable sorbents suitable in the methods and systems disclosed herein include, but are not limited to, carbonaceous char, activated carbon, reactivated carbon, natural and synthetic zeolite, silica, silica clay, carbon nanotubes, and graphene. For example, a suitable sorbent, such as activated carbon, may exhibit an apparent density of about 0.2 g/cm$^3$ to about 1 g/cm$^3$ such as about 0.3 g/cm$^3$ to about 0.7 g/cm$^3$, about 0.2 g/cm$^3$ to about 0.4 g/cm$^3$, or about 0.2 g/cm$^3$ to about 0.5 g/cm$^3$. Additionally or alternatively, a sorbent, such as activated carbon, may exhibit an iodine number of at least about 800 mg/g, such as about 800 mg/g to about 2000 mg/g, about 900 mg/g to about 1500 mg/g, or about 1000 mg/g to about 1500 mg/g. Suitable sorbents, such as activated carbon, may be characterized by a gravimetric molasses number of at least about 330, such as about 330-6000 or about 330 to about 900 (e.g., if coal-based) or about 1000 to about 6000 (e.g., if wood-based). Suitable sorbents may also have a moisture content of less than about 15%, more preferably less than about 10%, less than about 2.5%, or about 0.6% to about 2.5%. Preferably, less than about 5 wt. % of the sorbent, regardless of source, has a particle diameter of 40 mesh (US) or 0.425 mm or less, as determined by ASTM D2862-16 (or an equivalent thereof). Suitable sorbent additionally may have an ash content not exceeding about 23 wt. %. Suitable sorbent may, for example, have an ash content of about 23% or less, such as about 20% or less, about 15% or less, about 10% or less, 5%, or about 3% or less. In some embodiments, there is provided a method of purifying a coolant that contains one or more conductive contaminants, which includes contacting the coolant with a sorbent to thereby cause the sorbent to adsorb the one or more conductive contaminants, wherein the sorbent has a filtrate alkalinity of about 10 mg/L $CaCO_3$ to about 60 mg/L $CaCO_3$ (for example, about 10 mg/L $CaCO_3$, about 20 mg/L $CaCO_3$, about 30 mg/L $CaCO_3$, about 40 mg/L $CaCO_3$, about 50 mg/L $CaCO_3$, about 60 mg/L $CaCO_3$, or any range or value contained therein) and a filtrate electrical conductivity of less than about 650 μS, such as about 5 μS, about 10 μS, about 50 μS, about 100 μS, about 150 μS, about 200 μS, about 300 μS, about 400 μS, about 500 μS, about 600 μS, about 650 μS, or any range or value contained therein, and wherein the sorbent includes activated carbon. In some embodiments, the sorbent exhibits a combination of one or more of the above-described properties.

In order to effectively contact the coolant with the sorbet, a sorbent may be provided in a form suitable for passively or actively filtering the coolant. For example, returning to FIG. 1, a sorbent may be provided in cartridge form to be used in combination with an enclosure 110 such that the cartridge may be exchanged as needed. An enclosure 110 may include an inlet 114 and outlet 116 and a pump 112 to actively convey coolant through the sorbent cartridge within the enclosure 110. One of skill in the art will be familiar with methods and equipment suitable for use of a pump to convey coolant through a sorbent filter. For example, any commonly used as an automotive fuel pump may be used. Alternatively, the enclosure may itself be permeable to the coolant, for example, having perforated walls, where coolant may contact the sorbent passively. This configuration may be particularly useful where smaller volumes of coolant are required and diffusion of contaminants to the filter is sufficient for their removal. Optionally, an enclosure may additionally contain or be connected to a size-exclusion filter downstream of the sorbent to capture any sorbent material that is swept out in the effluent of the enclosure including the sorbent. For example, a filter may be about 325 mesh to about 40) mesh, such as about 200 mesh to about 40 mesh, about 100 mesh to about 40 mesh, or about 80 mesh to about 40 mesh. As used herein, the mesh sizes correspond to US sizes, where 325 mesh corresponds to an opening size of 44 μm, 200 mesh corresponds to an opening size of about 75 μm. 100 mesh corresponds to an opening size of about 150 μm. 80 mesh corresponds to an opening size of about 180 μm, and 40 mesh corresponds to an opening size of about 425 μm.

A sorbent may be provided in an enclosure in an amount that is about two to three times the mass of anticipated contamination in the coolant, an amount which is less than is presently recommended in the art. For example, the total amount of the elastomeric mass that will be contacted by the coolant may be totaled, followed by making an assumption that between about 0.1% (if relatively clean) to about 25% (in extreme cases) of that mass is contamination that may leech into the coolant. In any embodiment, for example, about 200 g of sorbent may be used to remove contaminants from up to about 800 L of coolant. A method for purifying coolant may include, in any embodiment, removing the sorbent and replacing said sorbent with fresh sorbent. Optionally, the sorbent, particularly in embodiments where the sorbent includes activated carbon, the sorbent may be reactivated or calcined by any methods known in the art for doing so.

The immersion cooling system, equipment assembly, and sorbent contained therein are not particularly limited with regard to compatible coolants and may be used to purify any coolant that is suitable for use in cooling electronic components. One of skill in the art will be familiar with a variety of useful coolants as well as the desired properties thereof. Generally, immersion cooling utilizes either a single phase or a two-phase cooling system to dissipate heat generated by the electronic component/s. Coolant in a single-phase cooling system generally is provided in liquid phase and remains in liquid phase throughout cooling, using convection, mechanical agitation, or a combination thereof to dissipate energy transferred from the electronic components to the coolant. The direction of energy flow (from device or to device) is determined by the relative energy (i.e., temperature) difference between the device and the heat transfer mechanism. In a two-phase system, coolant is generally provided as a liquid as well. Heat formed at the surface of the electronic components will transfer to the liquid coolant, vaporizing it to form gas bubbles, which rise to the surface of the liquid coolant. A condenser located above the surface of the liquid coolant may be operated at a temperature below that of the condensation temperature of the rising vapor, thereby condensing the vaporized coolant back to its liquid phase.

In any application, a coolant suitable for cooling electronic component may have a dielectric constant and electrical conductivity low enough to avoid any circuitry issues with the electronic component. For example, a suitable coolant may have a dielectric constant (e.g., as determined by ASTM D924) of less than about 10 at 1 KHz (e.g., about 0.1 to about 10), preferably less than about 7.5 (e.g., about 0.1 to about 7.5). Suitable coolants may have an electrical resistivity (e.g., as determined by ASTM D257-14) of less than about $10^8$ Ω·cm to about $10^{15}$ Ω·cm.

Additionally, a coolant may have a thermal conductivity and specific heat sufficient to transfer energy away from the electronic component as well as a viscosity that allows the coolant to move freely. For example, a suitable coolant may have a specific heat (e.g., as determined by ASTM E1269-11(2018)) of about 1000 J/kg·K to about 1350 J/kg·K. A suitable coolant may have a thermal conductivity (e.g., as determined by ASTM D2717-86) of about 0.05 W/m° ° C. to about 0.5 W/m° C. A suitable coolant may have a kinematic viscosity (e.g., as measured by ASTM D341-77) of not more than about 0.80 cSt, such as about 0.25 cSt to about 0.80 cSt.

A coolant suitable for use in a single-phase cooling system, for example, may exhibit a high atmospheric boiling point. In a two-phase cooling system, a coolant may have a boiling point lower than the working surface temperature of the electronic component (to ensure vaporization at the interface), but higher than ambient working to keep the bulk of the coolant in liquid phase. For example, a suitable coolant in a two-phase system may have a boiling point of about 34° C. to about 175° C. A coolant in a two-phase system may also exhibit a high latent heat of evaporation.

A coolant may be a single fluid or may be a mixture of fluids. Examples of suitable coolants include, but are not limited to, oils (e.g., mineral oils, vegetable oils, castor oil, silicone oils), ketones and perfluorinated ketones (e.g., 3M™ Novec™ 649 or 774 sold by 3M™), hydrocarbons and perfluorinated hydrocarbons (e.g., FC-72, FC-84, FC-3284, FC-3283, FC-40 sold by 3M™), polyphenyl ether or hydrofluoroether (HFE) fluids (e.g., Santovac™ 5 pump fluid, 3M™ Novec™ 7000, 7100, 7200, 7300, 7500, or 7700 sold by 3M™), hydrofluoroether olefins (HFEOs), hydrofluoroolefins (HFOs), hexafluoropropylene trimer (e.g., such as disclosed in U.S. Pat. No. 10,662,359, which is incorporated herein by reference to its disclosure of the trimer), diphenyl ether/biphenyl, or any mixture thereof.

Figure 2:
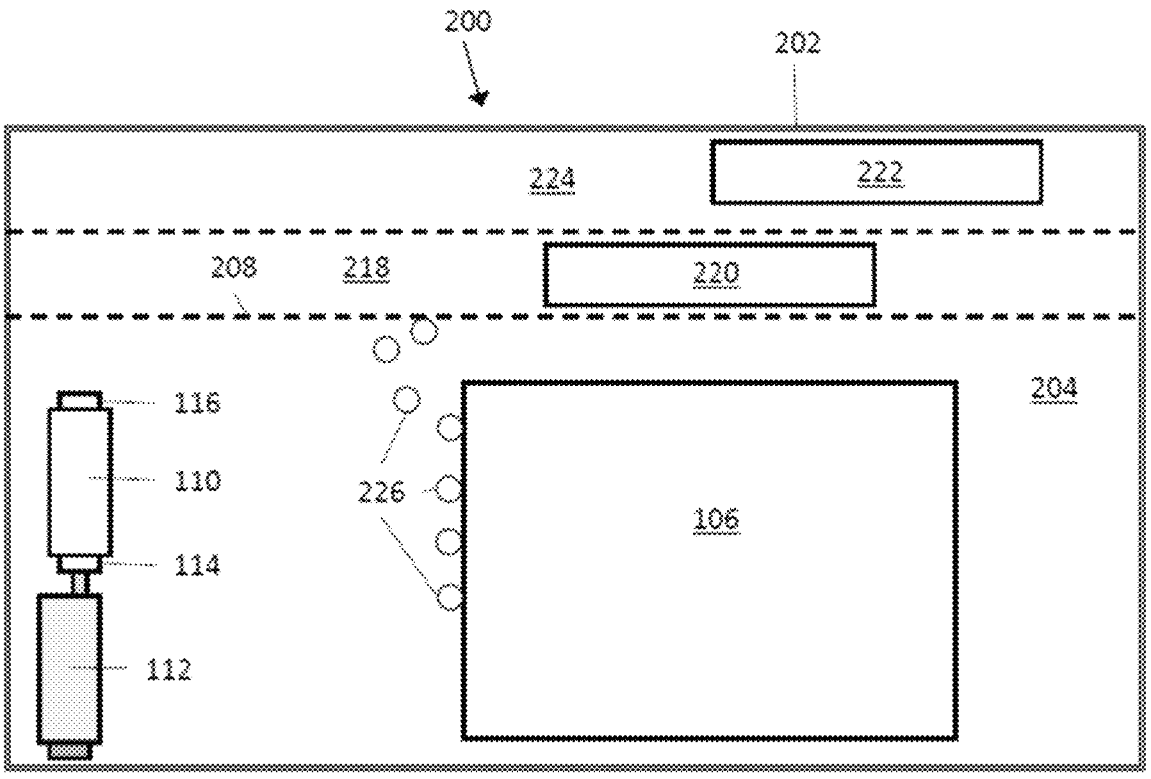
FIG. 2 depicts a schematic representation of a two-phase immersion cooling system in which a sorbent as disclosed herein may be used.

An immersion cooling system utilizing a sorbent as disclosed herein may further include components in addition to those listed above. As shown in FIG. 1, the coolant 104 as well as the electronic component 106 is contained within a tank 102, which may be made from welded metal (e.g., carbon steel, aluminum, stainless steel) or glass and insulated to prevent heat loss. A tank may be sufficiently sized to hold coolant sufficient to cool an electronic component therein. For example, a tank may be 500 L to 1000 L. In a two-phase cooling system, such as that shown in FIG. 2 (where all like numbers represent the same component as described for FIG. 1), vaporized coolant 226 rising to the coolant surface 208 will produce, above the coolant surface 208, a headspace of vapor called the vapor zone 218. A two-phase cooling system 200 may thus additionally include a condenser 220 located within the vapor zone 218 to re-liquefy vaporized coolant. A two-phase system may also include desiccant 222 to collect water that migrates to the headspace 224 above the vapor zone. Desiccant 222 may thus be located above the vapor zone 218 and be provided in an amount sufficient to collect the anticipated water, such as in an amount of at least five times the anticipated water mass. Immersion cooling systems and equipment assemblies may additionally include pressure-control, for example, through a bellow connected to a mechanical and pressure switch controlling a solenoid valve, as well as pumps for controlling fluid levels, heat sources, heat sinks, refrigeration systems, active or passive temperature control systems, heat exchangers, or any combination thereof.

There is provided a method of characterizing a sorbent, the method including providing a sorbent, which in some embodiments includes suspending the sorbent in a fluid, stirring the sorbent in the fluid, filtering the sorbent from the fluid to isolate a filtrate, measuring the electrical conductivity of the filtrate, and measuring the alkalinity of the filtrate.

The sorbent may include activated carbon, reactivated carbon, natural zeolite, synthetic zeolite, silica, silica gel, alumina, zirconia, and diatomaceous earths. In some embodiments, the sorbent has been treated via thermal or chemical methods, such as impregnation with additives, calcination, or combinations thereof. The treatment or treatments the sorbent has undergone prior to evaluation by the present method is/are not particularly limited.

In some embodiments, the fluid is deionized water. The fluid may, in some embodiments, have a resistivity of about 15 MΩ to about 20 MΩ. In some embodiments, the sorbent is stirred for a time for about 1 hour to about 24 hours. Stirring may be conducted by any method known to those skilled in the art, such as magnetic agitation, sonication, or other methods, or combinations thereof.

In some embodiments, measuring the alkalinity of the filtrate includes providing a sample of the filtrate, performing a first titration on the sample using a first acid and a first indicator to a first endpoint pH to provide a first alkalinity measurement, performing a second titration on the sample using a second acid and a second indicator to a second endpoint pH to provide a second alkalinity measurement, and calculating a total alkalinity of the sample.

In some embodiments, the first acid and the second acid include sulfuric acid. The sulfuric acid may be dilute or concentrated, and the concentration of the sulfuric acid is not particularly limited. In some embodiments, other strong acids may be used in the present method, including but not limited to nitric acid, hydrochloric acid, hydrobromic acid, or hydroiodic acid. In some embodiments, the first indicator includes phenolphthalein. In some embodiments, the second indicator includes bromocresol green-methyl red.

In some embodiments, the first endpoint pH is about 7.5 to about 9.0, for example, about 7.5, about 8.0, about 8.5, about 9.0, or any range or value contained therein. In some embodiments, the second endpoint pH is about 4.0 to about 5.0, for example about 4.0, about 4.1, about 4.2, about 4.3, about 4.4, about 4.5, about 4.6, about 4.7, about 4.8, about 4.9, about 5.0, or any range or value contained therein.

In some embodiments, calculating the total alkalinity of the sample includes adding the first alkalinity measurement and the second alkalinity measurement. In some embodiments, the method of the present disclosure further includes determining the concentration of carbonate ions, bicarbonate ions, and hydroxide ions in the filtrate. The first alkalinity measurement may be referred to as P-alkalinity or phenolphthalein alkalinity. Determining the concentration of carbonate, bicarbonate, and hydroxide ions in the filtrate may include, in some embodiments, determining the alkalinity contribution of each of carbonate, bicarbonate, and hydroxide and using this information to calculate the concentration of ions of each.

The relationship between total alkalinity and P-alkalinity can be used to determine the alkalinity contribution of each of carbonate, bicarbonate, and hydroxide in a given sample. When the P-alkalinity is zero, then the total alkalinity is equal to bicarbonate alkalinity. When the P-alkalinity is equal to the total alkalinity, then the total alkalinity is equal to hydroxide alkalinity. When the P-alkalinity is less than half of the total alkalinity, then the carbonate alkalinity is equal to the P-alkalinity multiplied by two and the bicarbonate alkalinity is equality to the total alkalinity minus the carbonate alkalinity. When the P-alkalinity is equal to half of the total alkalinity, then the carbonate alkalinity is equal to the total alkalinity. When the P-alkalinity is equal to more than half of the total alkalinity, then the hydroxide alkalinity is equal to the P-alkalinity multiplied by two minus the total alkalinity, and the carbonate alkalinity is equal to two times the total alkalinity minus the P-alkalinity. TABLE 1 summarizes these relationships and is adapted from Hach Method 8203 which is attached herein.

TABLE 1

| Row | Titration Result | Hydroxide Alkalinity | Carbonate Alkalinity | Bicarbonate Alkalinity |
|---|---|---|---|---|
| 1 | P-alkalinity = 0 | 0 | 0 | =Total alkalinity |
| 2 | P-alkalinity = Total alkalinity | =Total alkalinity | 0 | 0 |
| 3 | P-alkalinity < ½ Total alkalinity | 0 | =P-alkalinity × 2 | =Total alkalinity − (P-alkalinity × 2) |
| 4 | P-alkalinity = ½ Total alkalinity | 0 | =Total alkalinity | 0 |
| 5 | P-alkalinity > ½ Total alkalinity | =(P−alkalinity × 2) − Total alkalinity | =(Total alkalinity − P alkalinity) × 2 | 0 |

As shown in TABLE 1, there is provided a formula to use for determining the hydroxide, carbonate, and bicarbonate alkalinities depending on the P-alkalinity and total alkalinity of the sample. According to embodiments of the present method, the total alkalinity is substantially attributable to bicarbonate ions when the first alkalinity measurement is zero, the total alkalinity is substantially attributable to hydroxide ions when the second alkalinity measurement is zero, and the total alkalinity is substantially attributable to carbonate ions when the first alkalinity measurement is equal to half of the total alkalinity. In some embodiments of the present disclosure, the carbonate alkalinity is equal to the P-alkalinity multiplied by two and the bicarbonate alkalinity is equality to the total alkalinity minus the carbonate alkalinity when the P-alkalinity is equal to less than half of the total alkalinity. In some embodiments, the hydroxide alkalinity is equal to the P-alkalinity multiplied by two minus the total alkalinity, and the carbonate alkalinity is equal to two times the total alkalinity minus the P-alkalinity when the P-alkalinity is equal to more than half of the total alkalinity. In some embodiments and without wishing to be bound by theory, the method disclosed herein can be used to determine the type and concentrations of ions eluted by a sorbent and how sorbent treatment methods, such as calcination, affect the ions eluted from a sorbent. In some embodiments, it is advantageous to observe the ions eluted from the sorbent in order to select a sorbent and treatment method for a given application. In some embodiments, observing trends in alkalinity, electrical conductivity, and/or ion concentration as determined by methods described herein can be used to develop new sorbent treatment methods tailored to a specific application, depending on the needs of a user of the sorbent.

EXAMPLES

Before the Examples are described, the test methods shall be fully described.

Determination of the Gravimetric Molasses Number

To determine the gravimetric molasses number, the Calgon Carbon Corporation Test Method Number TM-3 ("TM-3") was utilized. TM-3 is intended to determine the decolorizing capacity of activated carbon. The decolorizing capacity of activated carbon describes the pore structure and material transport of the activated carbon. The determination of the gravimetric molasses number in accordance with TM-3. The volumetric molasses number was computed by multiplying the molasses number of TM-3 with the apparent density obtained by ASTM D2854-09 (2019). The gravimetric molasses number was determined by TM-3 as follows:

Limitations: The concentration of the molasses solution used for the test is dependent upon a Standard Carbon. As used herein, a "Standard Carbon" is an activated carbon sorbent material that is a reference material for the property of the gravimetric molasses number. As is appreciated by skilled practitioners in the art, a "200 Standard Carbon" can be expected to result in a gravimetric molasses number of 200, a "250 Standard Carbon" can be expected to have a gravimetric molasses number of 250, and so forth. A 200 Standard Carbon must be used for activated carbon products predicted to have less than a 230 gravimetric molasses number. A 250 Standard Carbon must be used for activated carbon products predicted to have less than 350 gravimetric molasses number. A 400 Standard Carbon must be used for activated carbon products predicted to have a 350 or greater gravimetric molasses number. Whenever a product has a molasses specification range that includes a Molasses Standard Carbon limit, the higher Molasses Standard Carbon should be used. In these cases, it is appropriate to include the Molasses Standard Carbon to be utilized on the Product Specification as a note to manufacturing. The molasses solutions cannot be diluted. A fixed path length of 2.5 mm must be used.

As is appreciated by those of skill in the art, the Standard Carbon is not limited so long as it is a suitable reference material for the molasses number. One example of a 400 Standard Carbon is "RB," which is available from Calgon Carbon Corporation of Moon Township, PA. RB is a powdered, steam-activated carbon made from bituminous coal that has a minimum gravimetric iodine number of 1070 mg/g, a gravimetric molasses number of 400, a maximum ash content of 23 wt. %, a maximum moisture content of 2 wt. %, and 60 wt. % to 75 wt. % of particles screened at 325 mesh or having sizes of less than 44 μm. A second example of a 320 Standard Carbon is "RC," which is available from Calgon Carbon Corporation of Moon Township, PA. RC is a powdered, steam-activated carbon made from bituminous coal that has a minimum gravimetric iodine number of 1020 mg/g, a gravimetric molasses number of 320, a maximum ash content of 23 wt. %, a maximum moisture content of 2 wt. %, and 60 wt. % to 75 wt. % of particles screened at 325 mesh or having sizes of less than 44 μm. A third example of a 230 Standard Carbon is "BL," which is available from Calgon Carbon Corporation of Moon Township, PA. BL is a powdered, steam-activated carbon made from bituminous coal that has a minimum gravimetric iodine number of 1000 mg/g, a gravimetric molasses number of 230, a maximum ash content of 10 wt. %, a maximum moisture content of 2 wt. %, and 60 wt. % to 75 wt. % of particles screened at 325 mesh or having sizes of less than 44 μm.

Principle of Method: A solution of blackstrap molasses is treated with a carbon of unknown decolorizing capacity and with a standard carbon having a molasses number as specified above. The higher Standard Carbon is used to measure values in the flat part of the decolorization curve, as shown in FIG. 3. The absorbance of the filtrates is determined on a standard Spectrophotometer at a wavelength of 472 nm with a path length of 2.5 mm. The molasses number of the sample is calculated from the ratio of the absorbance values of the sample and the standard carbon.

Safety Precautions: Careful handling and good laboratory techniques should always be used when working with laboratory equipment. The personnel conducting this test should be aware of the potential safety hazards associated with the equipment used in this procedure.

The instruments that were used in TM-3 are set forth in TABLE 2 below:

TABLE 2

| Device or Instrument | Description or Comments: |
|---|---|
| Drying Oven | Electrically heated forced convection drying oven capable of maintaining a constant temperature of 150 ± 5° C. |
| Hotplate/Stirrer | Capable of boiling 50 mL of deionized/distilled water in 3.5 minutes or less; Thermolyne Cimerac 3, Corning Model PC-320 or similar; surface temperature of the hotplate should be maintained at 350 ± 20° F. (177 ± 11° C.). |
| Spectrophotometer | Spectronic ® GenesysTM Spectrophotometer equipped with a filter holder to accommodate the 2.5 mm fixed path cell. Instrument is used at a wavelength of 472 nm. Equivalent Spectrophotometers can be used as long as the 2.5 mm fixed path length cell is used. Allow the instrument to warm up for a period of 30 minutes before using it. If using the Spectronic ® GenesysTM Spectrophotometer, the tungsten bulb has an operation life of 1000 hours. If the instrument is allowed to be on all the time, this would require the bulb be replaced once a month. The instrument has a built in program to keep track of bulb hours and can be accessed in the utilities functions on the instrument. See the manufacturer's instructions for more details. An example of a spectral scan is shown in FIG. 4, which depicts the transmittance of a molasses filter as a function of the wavelength of light. |
| KlettTM Summerson Cell | 2.5 mm fixed path length, optical glass; available from Hellma, 118-21 Queens Blvd, Forest Hills, NY 11375, 718-544-9534; Part No. 700.011. |
| Beaker | Griffin type, Kimax or Pyrex brand 400 mL. Inspect all beakers to ensure the bottom of the glass is flat. Concave or Convex shaped bottoms will give erratic results. Optional Standardization for Beakers included in Appendix B. Standardization will improve intra-laboratory precision; however, suppliers may not be able to supply consistent beakers over time. |
| Cylinders | Graduated, class A, calibrated to deliver, 50 mL and 1000 mL |
| Pipette | 50 mL volumetric, class A |
| Buchner Funnels | Size D, 71 mm inner diameter |
| Flasks | Filtering flasks with sidearm, 250 mL |
| Filter Paper | Whatman ® No. 3, 7 cm or similar |
| Vacuum Pump | Any unit capable of pulling a vacuum of 27 inches (685.8 mm) of mercury column at 0° C. |
| Balance | Capable of weighing to the nearest 0.1 mg. |
| Digital Thermocouple or Thermometer | Capable of measuring to the nearest tenth of a degree between 10° C. and 120° C., updating the reading at least every second. |
| Stopwatch | |

The reagents that were used in TM-3 are set forth in TABLE 3 below:

TABLE 3

| Reagent | Description or Comments: |
|---|---|
| ASTM Type II water | Conductance (μΩ) < 1.0<br>Resistance (MΩ) > 1.0<br>As used in the context of TM-3, the term "water" means ASTM Type II water. |
| Filter Paper Suspension | Add 16 circles (torn into quarters) of Whatman ® No. 3 filter paper and one liter of water to a blender. Mix on high for 30 seconds. Transfer to a suitable container. |
| Spectral Standard | Spectro-Chek set available from VWR Scientific, Catalog No. 58019-106. The set consists of four solutions, only two of which will be used to check the instrument in the visible range. Follow the instructions in "Procedure for Monitoring Visible Range, Section A - Variable Wavelength Instruments." This set will monitor deterioration of the components over time. It is recommended the standard be checked once a week to verify instrument operation. |
| Molasses Standard Carbon | A 200, 250 and 400 Standard Carbon is available from the Calgon Carbon Corporation Manufacturing Quality Assurance Organization. The 200 Standard Carbon is to be used for all activated carbon products having a predicted molasses number less than 230. The 250 Standard Carbon is to be used for all activated carbon products having a predicted molasses number greater than 230 and less than 350. The 400 Standard Carbon is to be used for all activated carbon products having a predicted molasses number greater than 350 molasses number. A Statistically valid Standard Carbon will be provided in the appropriate range and must be used for the calculations. |
| Internal Carbon Standard | It is recommended to run an internal carbon standard. Obtain a sufficient quantity of carbon having a molasses number between 200 to 300 and pulverize to 95%, −325 mesh. Oven dry the carbon and determine ten (10) replicate molasses number analyses of the carbon. Using the data obtained from the ten replicates, establish an SPC (statistical process control) chart. Use standard SPC guidelines to calculate upper and lower control limits for the carbon. Once the limits are established, analyze the Internal Carbon Standard before analyzing samples. If the result is found to be in-control, proceed with sample analysis. If the result is out-of-control, steps must be taken to determine the cause for the out-of-control result. Once a result is obtained for the Internal Standard Carbon that is in-control, proceed with sample analysis. Continue to plot results and follow standard SPC guidelines for determining out-of-control trends for the Internal Carbon Standard. |
| Blackstrap Molasses | Plantation Brand Blackstrap Molasses (Allied No. 444) purchased from:<br>Allied Old English, Inc.<br>100 Markley Street<br>Port Reading, NJ 07064<br>Note: Molasses from other sources will not yield equivalent results and is an important factor in control of test repeatability and reproducibility |
| Molasses Solution | Dilute a sufficient quantity (approximately 50 grams/liter) of blackstrap molasses with one liter of deionized/distilled water (per ASTM Type II) total volume to produce a filtrate with an absorbance of 0.630 to 0.650 when treated with Molasses 200 or 250 Standard Carbon and an absorbance of 0.390 to 0.410 when treated with Molasses 400 Standard Carbon. See Table 3 for Preparation and Standardization of the Molasses Solution for both Standard Carbon. |

The molasses solutions were prepared in accordance with the following procedure:

1. About 50 grams of blackstrap molasses was weighed into a clean, dry beaker and set aside until water was heated to 95° C.
2. Using a graduated cylinder, 1000 mL of ASTM Type 2 water was added to a stainless steel beaker.
3. The beaker was covered with aluminum foil or a large glass cover, placed on a hotplate, and heated to 95° C.
4. When the water reached 95° C., the weighed molasses was transferred to the stainless steel beaker and stirred to mix well. The stainless steel beaker was removed from the hotplate.
5. The solution was cooled to room temperature (about 25° C.).
6. The molasses solution from the stainless steel beaker was siphoned into a suitable container. A piece of TYGON tubing was placed in the beaker so the end of the tubing was one inch off of the bottom of the beaker. A pipette bulb was used to begin the siphon. The solution was syphon into a separate container (e.g., a large glass bottle).
7. The remaining beaker content was discarded. The molasses solution was stored in the refrigerator for up to 24 hours. The molasses solution was kept on ice while running the test method.
8. 0.46±0.0002 grams of the 250 Molasses Standard carbon was weighed into a clean, dry, 400 ml beaker.

200 and 250 Standard Carbon Standardization 9. 50 mL of the molasses solution was pipetted into the beaker. The beaker was swirled while adding the molasses solution until the carbon was thoroughly wetted.
10. The beaker was placed on the hotplate and the thermocouple/thermometer was placed in the beaker so the tip rests on the bottom of the beaker. The solution was heated until the thermocouple/thermometer reaches 98° C. and a stopwatch was started. The thermocouple or thermometer was removed and the solution was allowed to boil for 30 seconds.

11. The sample was filtered by vacuum through a Buchner funnel using a Whatman® No. 3 filter paper which was previously prepared. The filter was covered with about 20 mL of the solution and this filtrate was discarded. The remaining portion was filtered.
12. The absorbance of the filtrate on the Spectrophotometer at a wavelength of 472 nm was measured and recorded, using a 2.5 mm fixed path cell. The solution was considered standardized when the absorbance was between 0.630 and 0.650.
13. The solution was considered too dark when the absorbance was greater than 0.650. To determine the amount of water to be added, the amount of molasses solution was measured and multiplied by 0.640 and by the absorbance recorded from step 12. The numbers were subtracted and the result was the amount of water in milliliters to be added to the molasses solution. The water was added and the solution was mixed well. Steps 8-13 were repeated until three successive analyzed samples had absorbance values between 0.630 and 0.650.
14. The solution was considered too light when the absorbance was less than 0.630. To determine the amount of molasses to be added, the amount of molasses solution was measured and multiplied by 0.640 and by the absorbance recorded from step 12. The two numbers were subtracted, the result of the subtraction was divided by 10, and the result of the division was used as the amount (weight) of molasses that was added into a small glass beaker. About 25 mL of the molasses solution was added to the beaker to dissolve the molasses. The beaker was heated on a hotplate to 90° C. and afterward cooled slightly. The contents were added to the molasses solution and mixed well. Steps 8-14 were repeated until three successive samples with absorbance values between 0.630 and 0.650 were obtained.

400 Standard Carbon Standardization 15. 0.46±0.0002 grams of the 400 Molasses Standard carbon was weighed into a clean, dry 400 ml beaker.
16. 50 mL of the molasses solution was pipetted into the beaker. The beaker was swirled while adding the molasses solution until the carbon is thoroughly wetted.
17. The beaker was placed on the hotplate and the thermocouple/thermometer was placed in the beaker so the tip rests on the bottom of the beaker. The solution was heated until the thermocouple/thermometer reaches 98° C. and a stopwatch was started. The thermocouple or thermometer was removed and the solution was allowed to boil for 30 seconds.
18. The sample was filtered by vacuum through a Buchner funnel using Whatman® No. 3 filter paper which was previously prepared. The filter was covered with about 20 mL of the solution and this filtrate was discarded. The remaining 30 mL portion was filtered and used for subsequent measurements.
19. The absorbance of the filtrate on the Spectrophotometer at a wavelength of 472 nm was measured and recorded, using a 2.5 mm fixed path cell. The solution was considered standardized when the absorbance was between 0.390 and 0.410.
20. The solution was considered too dark when the absorbance was greater than 0.410. To determine the amount of water to be added, the amount of molasses solution was measured and multiplied by 0.400 and by the absorbance recorded from step 19. The numbers were subtracted and the result was the amount of water in milliliters that was added to the molasses solution. Water was added and the solution was mixed well. Steps 15-20 were repeated until three successive samples with absorbance values between 0.390 and 0.410 were obtained.
21. The solution was considered too light when the absorbance was less than 0.390. To determine the amount of molasses to be added, the amount of molasses solution was measured and multiplied by 0.400 and by the absorbance recorded from step 19. The two numbers were subtracted, the result of the subtraction was divided by 10, and the result of the division was the amount (weigh) of molasses that was added into a small glass beaker. About 25 mL of the molasses solution was added to the beaker to dissolve the molasses. The resulting solution was heated on a hotplate to 90° C. and then cooled slightly. Contents to the molasses solution was added and mixed well. Steps 15-21 were repeated until three successive samples with absorbance values between 0.390 and 0.410 were obtained.

Optionally, the beakers were standardized. Beaker standardization is intended to identify and eliminate beakers with boiling times that are grossly different from the others being used for the test. Elimination of these beakers improves intra-laboratory precision. When a supplier cannot supply consistent beakers over time, a new mean for all beakers being tested should be established. The mean should not include those beakers that are more than three (3) standard deviations.

The beakers were standardized in accordance with the following procedure:

1. Identify all beakers with number or other specific marking.
2. Using a 50 mL pipette, add 50 mL of deionized/distilled water to each of the 400 mL beakers to be standardized for use in TM-3.
3. Place the beaker on a hotplate and insert the thermocouple or thermometer so it rests on the bottom of the beaker and start the stopwatch.
4. Measure the time it takes for the water in the beaker to reach 95° C. and record the time to the nearest second.
5. Determine the average time for the set of beakers being standardized.
6. Beakers having times ±20 second from the average can be used for sample analysis and standardization for TM-3.
7. Beakers not falling within the 20 second range cannot be used to analyze samples or standards for TM-3.

The samples were analyzed according to the following procedure:

1. A sample of carbon was provided and ground until 95% or more of it passes through a 325 mesh screen. If the sample was not from a recent production, it was dried at 150° C. to a constant weight prior to use. The Standard Carbon internal carbon standards were prepared in the same manner. An equal amount was pulverized to ensure that the fineness of the materials is equivalent.
2. 0.46±0.0002 gram portions of dried, pulverized carbon samples were weighed into separate clean and dry 400 mL beakers.
3. Filtration setups for sample filtration were prepared. A Whatman® No. 3 filter circle was placed in the Buchner funnel. The funnel was connected to the 250 mL filtering flask and the filtration vacuum was initiated. 50 mL of the filter paper suspension was added while making sure to coat the entire surface of the filter paper circle. After all the liquid was drained, the filtrate collected in the filtering flask was discarded.

4. 50 mL of the standardized molasses solution was pipetted into the beaker containing the carbon to be analyzed. The beaker was swirled while adding the molasses solution until the carbon was thoroughly wetted.
5. The beaker was placed on the hotplate and the thermocouple or thermometer was placed in the beaker so the tip rests on the bottom of the beaker. The solution was heated until the thermocouple reads 98° C. and a stopwatch was started. The thermocouple or thermometer was removed and the solution was allowed to boil for 30 seconds.
6. The sample was filtered by vacuum through a Buchner funnel using a Whatman® No. 3 filter paper which was previously prepared according to Step 3. The filter was covered with about 20 mL of the sample and this filtrate was discarded. The remaining portion was filtered.
7. The absorbance of the filtrates on the Spectrophotometer at a wavelength of 472 nm was measured and recorded, using the 2.5 mm fixed path Klett™ Summerson Cell. Deionized or distilled water was used as reference.
8. The molasses number was calculated:

$$\text{Molasses Number}=(A\times B)/C$$

wherein A is the molasses number of the Standard Carbon (250 or other): B is the average absorbance of three determinations for the 250 Standard Carbon or other Standard Carbon; and C is the absorbance of the filtrate of the activated carbon being analyzed.

9. The Molasses Number was reported to the nearest increment of ten using conventional rounding techniques. (e.g. 226=230)

Example 1—Filtrate Electrical Conductivity Method

The filtrate electrical conductivity method described herein was conducted on several representative sorbent samples. The method was performed as follows: 100 ml of deionized water is added to a 125 ml Erlenmeyer flask that has been pre-rinsed with deionized (DI) water. The deionized water is of sufficient "quality" to have a resistivity of about 17.5 MΩ to about 18.2 MΩ. Flasks containing 100 mL DI water are prepared for each of the carbon samples to be tested along with an additional "blank" control with no carbon present. The flasks are then stirred at 300 rpm using a pre-rinsed magnetic stir bar. Then, 10 grams of activated carbon sample is weighed and added to each flask except one, creating aqueous activated carbon suspensions. If not subjected to any recent thermal treatments, the activated carbon samples may be dried (150° C. for 3 hours in air) to remove any superficial moisture that would impact the actual mass of carbon added to the flask. The flasks are then allowed to stir for time periods of 1, 4, or 24 hours. The flasks are capped or covered using parafilm during the stirring.

After stirring, the Erlenmeyer flasks are removed from the stir-plate and allowed to sit for 5 min such that the activated carbon settles. Next, the clarified portion of the carbon suspension is filtered using a pre-rinsed syringe that contains a pre-rinsed a 0.7-micron syringe filter. 40 ml of filtrate is collected. The DI water blank is also filtered in a similar manner. The filtrate samples are then transferred to 50 ml test tubes containing small magnetic stir bars (both the test tube and stir bar are pre-rinsed with DI water). At this point, the solution electrical conductivity of each filtrate is measured using a calibrated Oakton 2700 Series Conductivity under gentle stirring. The electrical conductivity is reported in units of micro-Siemens (μS).

F/S RB Results

The 8×40 mesh coal-based activated carbon used in this work is known as F/S RB and is made by Calgon Carbon. The F/S RB is steam activated and exhibits high iodine and high molasses numbers as compared to other coal-based activated carbons like F400. Filtrates obtained from suspensions of dried and calcined F/S RB were analyzed via the filtrate electrical conductivity method. The results are given below.

FIG. 5 is a bar graph of filtrate electrical conductivity of a first set of representative sorbent samples. FIG. 5 shows the filtrate electrical conductivity results obtained from a given lot of F/S RB produced in 2017 and herein referred to as Lot #1. The filtrates from the dried and calcined F/S RB aqueous suspensions were collected after 1, 4, or 24 hours of stirring. Filtrate electrical conductivity measured from suspensions of the dry F/S RB are shown in the light grey bars and the dark grey bars represent filtrate collected from calcined F/S RB. In FIG. 5, the measured conductivities of the filtrates collected from the calcined activated carbon suspensions were about 2.0-2.5× higher than that of the filtrates collected from the dried carbon suspension regardless of agitation time. It appears that calcination imparts changes to the activated carbon surface that leave it prone to eluting ionic species into the liquid phase of the suspension that can be quantified using the filtrate electrical conductivity measurement method described herein. The variability of the measurement as noted in the error bars shown in FIG. 5 is small and repeatable enough that there is a clear delineation between the dry and calcined filtrate electrical conductivity data. This suggests that this measurement could be a useful production or quality assurance (QA) type tool for monitoring the calcination process or product quality at scale.

Since the difference in the observed filtrate electrical conductivity between the dried and calcined F/S RB was unexpected, the filtrate electrical conductivity experiments were repeated using a lot of F/S RB that was produced several years later in 2020 (referred to as Lot #2). The results of this effort are shown in FIG. 6 and show the same trends observed in FIG. 5. FIG. 6 is a bar graph of filtrate electrical conductivity of a second set of representative sorbent samples. In this data set, the conductivities of the filtrates collected from the calcined F/S RB suspensions were on average, about 1.7-2.0× higher than filtrates collected from the dry F/S RB suspensions. As before, this difference was observed for all agitation times and variability was low. Based on the collective results reported in FIG. 5 and FIG. 6. 1 hour of agitation time is sufficient for the purposes of developing a robust QA-type method.

FIG. 8 is a bar graph showing the filtrate conductivity of five lots of F/S RB materials agitated for 1 hour (Lot #1, Lot #2, Lot #3, Lot #4, and Lot #5). Lot #3 was produced in 2021 and Lots #4-5 were produced in 2022. FIG. 8 demonstrates a similar trend as observed in FIG. 5 and FIG. 6, wherein the calcined material exhibits a higher filtrate conductivity than the dried or as-is (untreated) material. The testing of Lots #1-5 shown in FIG. 8 was performed several months after the original testing shown in FIG. 5 and FIG. 6, demonstrating the reproducibility of the presently disclosed methods.

BGX Results

In these experiments, a 12×40 mesh wood-based activated carbon known as BGX was used. This is a commercial Calgon product that is activated with phosphoric acid. This acid-based activation process gives the BGX carbon an acidic character as noted by contact pH values that are typically less than 5 (Calgon TM-62 Method). The BGX is quite different than the steam activated F/S RB which has an alkaline contact pH typically measured at about 9.5 or greater. Because of the differences in base material and activation method, the trends in BGX filtrate electrical conductivity are different as shown in FIG. 7. FIG. 7 is a bar graph of filtrate electrical conductivity of a third set of representative sorbent samples. When comparing the BGX filtrate electrical conductivity results in FIG. 7 to those of the F/S RB in FIG. 5 and FIG. 6, the overall electrical conductivity measured is significantly higher with values ranging anywhere from about 290 to 565 μS vs. a maximum of only 160 μS for the F/S RB (FIG. 6). This higher level of electrical conductivity for the BGX is likely from residual from phosphoric acid or phosphate groups present within the activated carbon's pore structure, without wishing to be bound by theory.

There was little difference in the electrical conductivity measurements of the filtrates collected from the dry BGX suspensions regardless of agitation time as shown in the blue colored data in FIG. 7. The electrical conductivity only varies about 10% within a range of about 510-565 μS. However, the change in filtrate electrical conductivity observed for the calcined BGX suspensions does change dramatically with agitation time as shown in the orange data of FIG. 7. Here the filtrate electrical conductivity differs by nearly 250 μS for filtrate collected after 15 min vs. 24 hours of agitation. This dynamic may suggest that the calcination process is removing a certain fraction of the residual ionic species from the activated carbon surface due lower amounts of electrical conductivity measured between 15 minutes and 4 hours of agitation time. However, it may be that residual phosphate groups (or other ionic species) that adsorb tightly or that reside within finer portions of the activated carbon's pore structure require more residence time to elute into the aqueous portion of the suspension. This seems apparent sometime between after 1 hour of agitation time, as one sees significant increases in electrical conductivity at 4 and 24 hours in FIG. 7 for the calcined filtrates.

Even though the trends or magnitude of electrical conductivity of the BGX experiments are different than the F/S RB evaluations, one can likely use filtrate electrical conductivity to track differences between the calcined and dry BGX as a quality assurance-type tool. Through additional experimentation completed at more aggressive calcination conditions that utilize longer heating times, higher temperatures, and/or different atmospheres, it might be possible to strip the BGX of more surface functionality, thereby enhancing its performance in applications affected by acidic surface groups.

Example 2—Filtrate Alkalinity and pH Measurements

Alkalinity in water with a pH of greater than 7 is usually attributable to the presence of dissolved species such as bicarbonate, carbonate, and hydroxide ions and can be expressed in parts per million of calcium carbonate (ppm $CaCO_3$) by titrating a water sample to different end points using an acid. A method offered by Hach (Catalog #24443-01) determines the alkalinity of a sample by titrating it using dilute sulfuric acid to an endpoint of 8.3 in the presence of a color changing phenolphthalein indicator, which changes color from pink to as the pH decreases. This titration determines a type of alkalinity known as phenolphthalein (P-Type) alkalinity. Once the pH endpoint of 8.3 is reached, the sample can be titrated further using dilute sulfuric acid to a pH endpoint of about 4.3-4.6 in the presence of a color changing indicator known as bromocresol green-methyl red (BCG-MR), which changes color from blue to pink as the pH decreases. Once this acidic endpoint has been reached, the concentration of all ionic species contributing the total overall alkalinity should be accounted for. By adding the phenolphthalein alkalinity measurement and the BCG-MR alkalinity measurement, one can determine the total alkalinity of the sample.

The alkalinity analysis can be taken a step further by using the measured phenolphthalein and total alkalinity relationships provided in Hach Method 8203 (which may be carried out via several experiment setups, including Hach Catalog #2444301) to estimate the specific concentrations of carbonate, bicarbonate, or hydroxide ions that include the sample's alkalinity. The alkalinity of the sample and therefore the concentrations of these ions are important since they will impact the electrical conductivity measured in the filtrate conductivity method described herein. The "speciation" of the sample alkalinity may also provide additional insight into the chemical nature of the activated carbon surface if it is leaching certain ions into the DI water portion of the activated carbon suspension. Finally, measurements of filtrate pH using a common pH probe can be used to further understand differences in filtrate alkalinity and the related solution electrical conductivity.

To better understand the results observed in the filtrate electrical conductivity testing, filtrate alkalinity testing was performed on F/S RB Lot #1 filtrate samples as described above in FIG. 5. TABLE 4 shows these filtrate alkalinity results using the Hach Alkalinity Test Kit Catalog (#24443-01). Regardless of agitation time, the phenolphthalein (P-Type) and total alkalinity are larger for those filtrates obtained from the calcined F/S RB suspension relative to the dry F/S RB filtrate. This is consistent with the increases in filtrate electrical conductivity reported in FIG. 5. One also notes higher pH measurements for the filtrates obtained from the calcined F/S RB suspensions irrespective of agitation time. The total alkalinity of control DI water (DI water not exposed to activated carbon) was measured to be 15 mg/L $CaCO_3$, with no contribution from the P-type alkalinity.

TABLE 4

| | 1-hr Agitation Time | | 4-hr Agitation Time | | 24-hr Agitation Time | |
|---|---|---|---|---|---|---|
| Alkalinity Type | Dry | Calcined | Dry | Calcined | Dry | Calcined |
| P-Alkalinity (as mg/L $CaCO_3$) | 0 | 15 | 0 | 10 | 0 | 15 |
| Total Alkalinity (as mg/L $CaCO_3$) | 30 | 55 | 35 | 55 | 35 | 50 |
| Filtrate pH | 9.74 | 10.4 | 9.89 | 10.35 | 9.67 | 10.41 |

If one assumes that the primary forms of alkalinity in the filtrate are hydroxide (OH), carbonate ($CO_3^{2-}$), and/or bicarbonate ions ($HCO_3^-$), the alkalinity measurements in TABLE 4 can be used to calculate the amounts of these species in the filtrate using relationships provided in Hach Method 8203 (as reported in TABLE 1). These relationships indicate that if the if the P-type alkalinity is equal to zero, then the alkalinity contributions from hydroxide and carbonate species are equal to zero. Therefore, it can be assumed that the total alkalinity of the sample is attributable to the presence of bicarbonate ions. However, according to Hach Method 8203, if the P-type alkalinity is non-zero but less than half the total alkalinity, the hydroxyl ion contribution to the alkalinity is assumed to be zero and the carbonate alkalinity is equal to twice that of the P-type alkalinity. Then, the remaining alkalinity contributing to the total alkalinity measurement can be assumed to be due to the presence of bicarbonate ions (bicarbonate alkalinity), which is found by subtracting the total alkalinity from the carbonate alkalinity.

Using these relationships, TABLE 5 describes the alkalinity of the carbon suspension filtrates based on estimates of either carbonate and/or bicarbonate alkalinity. The pH of each suspension filtrate is also provided for reference. In all cases, the hydroxyl ion alkalinity was zero either because no P-alkalinity was measured as was the case for the dry F/S RB filtrates, or the P-alkalinity was less than half of the total alkalinity which was the case for all calcined F/S RB filtrates. (Refer to TABLE 4). In all cases, it seems that the calcined F/S RB suspensions impart additional filtrate alkalinity by adding carbonate alkalinity to the bicarbonate alkalinity, whereas the alkalinity for the filtrates obtained from the dry F/S RB can be attributed to only bicarbonate alkalinity.

TABLE 5

| | 1-hr Agitation Time | | 4-hr Agitation Time | | 24-hr Agitation Time | |
|---|---|---|---|---|---|---|
| Alkalinity Type | Dry | Calcined | Dry | Calcined | Dry | Calcined |
| Bicarbonate Alkalinity ($HCO_3^-$) as mg/L CaCO3 | 30 | 25 | 35 | 35 | 35 | 35 |
| Carbonate alkalinity ($CO_3^{2-}$) as mg/L $CaCO_3$ | 0 | 30 | 0 | 20 | 0 | 30 |
| Filtrate pH | 9.74 | 10.40 | 9.89 | 10.35 | 9.67 | 10.41 |

TABLE 5-continued

| | 1-hr Agitation Time | | 4-hr Agitation Time | | 24-hr Agitation Time | |
|---|---|---|---|---|---|---|
| Alkalinity Type | Dry | Calcined | Dry | Calcined | Dry | Calcined |

The presence of the carbonate alkalinity in the calcined F/S RB filtrates and their higher filtrate pH values (relative to the dry F/S RB filtrates) suggests that an equilibrium unique to the filtrates from the calcined F/S RB may exist between carbonate and bicarbonate ions. This equilibrium can be described by Equation 1.

$$HCO_3^- + H_2O + OH^- \leftrightarrow CO_3^{2-} + 2H_2O \quad \text{(Equation 1)}$$

While not wishing to be bound by theory, one can use Equation 1 and the data in TABLE 5 to surmise that the calcination of the F/S RB is resulting in a rise in filtrate pH from the creation of hydroxyl groups on the activated carbon surface that are then reacting with bicarbonate anions to form carbonate anions. The creation of these hydroxyl groups is shifting the filtrate pH towards values over 10 which contributes to the formation of carbonate ions. There likely is not an excess of the hydroxyl groups however as they were not measured directly (using the Hach methods). The enhanced filtrate alkalinity, however, from the creation of the hydroxyl groups on the calcined carbon may be beneficial in the immersive cooling application where there is a need to mitigate secondary acid-based or acid-catalyzed reactions.

TABLE 6 is an extension of the type of data presented in TABLE 4 and provides additional information on the P-alkalinity and total alkalinity of filtrates collected from five lots of F/S RB activated carbon. Methods used to generate the data were the same as described above and all product (as-is, dry, or calcined) filtrates were collected after 1 hour of agitation. In TABLE 6, "as-is" refers to filtrates collected from F/S RB that is not exposed to any further thermal processing after its production, "dry" refers to filtrates collected from F/S RB that has been dried as described previously, and "calc." refers to filtrates collected from F/S RB that has been calcined in nitrogen at high temperature as described previously.

TABLE 6

| | Lot #1 Filtrate | | | Lot #2 Filtrate | | | Lot #3 Filtrate | | | Lot #4 Filtrate | | | Lot #5 Filtrate | | |
|---|---|---|---|---|---|---|---|---|---|---|---|---|---|---|---|
| Alkalinity Type | As Is | Dry | Calc. | As Is | Dry | Calc. | As Is | Dry | Calc. | As Is | Dry | Calc. | As Is | Dry | Calc. |
| P-Alkalinity (as mg/L $CaCO_3$) | 5 | 5 | 15 | 5 | 5 | 20 | 20 | 20 | 30 | 5 | 10 | 20 | 5 | 10 | 25 |
| Total Alkalinity (as mg/L $CaCO_3$) | 30 | 30 | 45 | 35 | 35 | 45 | 50 | 50 | 60 | 35 | 40 | 50 | 35 | 40 | 55 |
| Filtrate pH | 9.22 | 9.66 | 10.19 | 9.25 | 9.68 | 10.42 | 10.08 | 10.11 | 10.69 | 9.26 | 9.84 | 10.46 | 9.38 | 9.99 | 10.51 |

As shown in TABLE 6, an increase in filtrate pH, P-alkalinity, and total alkalinity was observed in the calcined product filtrates compared to the dry and as-is product filtrates. It should be noted that Lot #3 had a higher pH, P-alkalinity, and total alkalinity for the initial, as-is product; filtrate however, a similar trend in the increase in these values was observed compared to the other lots. As shown in TABLE 6, the filtrate pH increases across all five lots from as-is to dried, and from dried to calcined, which further supports the accuracy of the disclosed data.

TABLE 7 is an extension of the type of data presented in TABLE 5. It provides additional information on the bicarbonate and carbonate alkalinity of the filtrates described in TABLE 6 using the relationships described in TABLE 1.

TABLE 7

| | Lot #1 Filtrate | | | Lot #2 Filtrate | | | Lot #3 Filtrate | | | Lot #4 Filtrate | | | Lot #5 Filtrate | | |
|---|---|---|---|---|---|---|---|---|---|---|---|---|---|---|---|
| Alkalinity Type | As Is | Dry | Calc. | As Is | Dry | Calc. | As Is | Dry | Calc. | As Is | Dry | Calc. | As Is | Dry | Calc. |
| Bicarbonate Alkalinity ($HCO_3^-$) as mg/L $CaCO_3$ | 20 | 20 | 15 | 25 | 25 | 5 | 10 | 10 | 0 | 25 | 20 | 10 | 25 | 20 | 5 |
| Carbonate alkalinity ($CO_3^{2-}$) as mg/L $CaCO_3$ | 10 | 10 | 30 | 10 | 10 | 40 | 40 | 40 | 60 | 10 | 20 | 40 | 10 | 20 | 50 |
| Filtrate pH | 9.22 | 9.66 | 10.19 | 9.25 | 9.68 | 10.42 | 10.08 | 10.11 | 10.69 | 9.26 | 9.84 | 10.46 | 9.38 | 9.99 | 10.51 |

As shown in TABLE 7, there was an increase observed carbonate alkalinity and a decrease in bicarbonate alkalinity in filtrates collected from the calcined products, as compared to filtrates collected from the as-is and dried products.

FIG. 8 shows the filtrate electrical conductivity data for examples described in TABLES 6 and 7. As before, one observes an increase in filtrate conductivity for the calcined F/S RB filtrate, relative to the dry F/S RB filtrate. Additionally, the calcined F/S RB filtrate also has a higher electrical conductivity than the as-is F/S RB filtrate.

Example 3—Characterization

The F/S RB activated carbon from Lots 1-5 referred to in TABLES 6 and 7, and FIG. 8 were characterized with respect to apparent density (AD), moisture content, and oxygen content via elemental analysis, where applicable. This data is shown in TABLE 8.

TABLE 8

| As-is | | |
|---|---|---|
| Activated Sample: | AD | Moisture Content (%) |
| Lot #1 | 0.396 | 2.95 |
| Lot #2 | 0.407 | 2.45 |
| Lot #3 | 0.400 | 1.85 |
| Lot #4 | 0.411 | 3.45 |
| Lot #5 | 0.425 | 3.95 |

| Activated Carbon Sample: | AD | Moisture Content (%) | Oxygen Content (%) |
|---|---|---|---|
| Dried | | | |
| Lot #1 | 0.395 | 1.05 | 2.59 |
| Lot #2 | 0.407 | 0.90 | 2.35 |
| Lot #3 | 0.394 | 0.85 | 2.67 |
| Lot #4 | 0.399 | 0.90 | 2.59 |
| Lot #5 | 0.409 | 1.10 | 2.48 |
| Calcined | | | |
| Lot #1 | 0.392 | 0.80 | 1.91 |
| Lot #2 | 0.405 | 0.60 | 1.68 |
| Lot #3 | 0.388 | 0.60 | 1.81 |
| Lot #4 | 0.396 | 0.60 | 1.86 |
| Lot #5 | 0.404 | 0.40 | 1.94 |

The reduced levels of oxygen present in the calcined product can be attributed to the elimination and/or alteration of certain acidic, oxygen-containing moieties on the carbon surface, which increases the alkaline nature of the activated carbon. This is reflected in the increased alkalinity of the filtrates collected from the calcined F/S RB material, relative to the other filtrates.

TABLE 9 provides characterization data of the "as-is" F/S RB activated carbons used as the source materials for all data provided in TABLES 6-8 and FIG. 8. This data includes elemental analysis of nitrogen, carbon, hydrogen, and sulfur, along with iodine and molasses numbers and ash content. No strong correlation was observed between the data in TABLE 9 and the filtrate conductivity or alkalinity obtained from the calcined product. This data shows that differences observed after calcination were imparted by the thermal processing itself, rather than a specific attribute of the starting material.

TABLE 9

| Activated Sample: | N | C | H | S | Iodine Number | Molasses Number | Ash |
|---|---|---|---|---|---|---|---|
| Lot #1 | 1.0 | 85.2 | 0.8 | 0.8 | 1332 | 499 | 10.3 |
| Lot #2 | 0.9 | 84.5 | 0.8 | 0.7 | 1293 | 512 | 11.8 |
| Lot #3 | 1.0 | 85.9 | 0.4 | 0.6 | 1291 | 890 | 11.2 |
| Lot #4 | 0.5 | 86.1 | 0.4 | 0.6 | 1266 | 830 | 12.1 |
| Lot #5 | 0.4 | 85.9 | 0.4 | 0.6 | 1224 | 660 | 11.2 |

The above examples demonstrate that filtrate conductivity generally decreases from as-is product to dried product, and increases from dried to calcined product. There is a general increase in P-alkalinity after calcination, along with a conversion of bicarbonate alkalinity to carbonate alkalinity. An increase in filtrate pH and contact pH and a decrease in oxygen content were observed across all five lots of RB product.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 compounds refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A method of purifying a coolant that contains one or more conductive contaminants, comprising:

contacting the coolant with a sorbent to thereby cause the sorbent to adsorb the one or more conductive contaminants, wherein the sorbent has a filtrate alkalinity of about 10 mg/L $CaCO_3$ to about 60 mg/L $CaCO_3$ and a filtrate electrical conductivity of less than about 650 μS, and wherein the sorbent comprises activated carbon.

2. The method of claim 1, wherein the sorbent has a filtrate alkalinity of about 30 mg/L $CaCO_3$ to about 50 mg/L $CaCO_3$.

3. The method of claim 1, wherein the sorbent has a filtrate electrical conductivity of about 5 μS to about 200 μS.

4. The method of claim 1, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material, or combinations thereof.

5. A composition for purifying a coolant that contains one or more conductive contaminants, the composition comprising:

a sorbent that has a filtrate alkalinity of 10 mg/L $CaCO_3$ to about 60 mg/L $CaCO_3$ and a filtrate electrical conductivity of less than about 650 μS, wherein the sorbent comprises activated carbon.

6. The composition of claim 5, wherein the activated carbon is formed from one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material, or combinations thereof.

7. A method for making a sorbent for purifying a coolant that contains one or more conductive contaminants, comprising:

providing a precursor sorbent material, and performing at least one treatment method on the precursor sorbent material to thereby form a sorbent that has a filtrate alkalinity of 10 mg/L $CaCO_3$ to about 60 mg/L $CaCO_3$ and a filtrate electrical conductivity of less than about 650 μS, wherein the sorbent comprises activated carbon.

8. The method of claim 7, wherein the precursor sorbent material is formed from one or more of one or more of bituminous coal, sub-bituminous coal, lignite coal, anthracite coal, wood, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, other carbonaceous material, or combinations thereof.

9. The method of claim 7, wherein the at least one treatment method comprises one or more of:

calcining, drying, processing under vacuum, nitrogen, hydrogen, carbon monoxide, ammonia, methane, argon, or combinations thereof, microwave assisted thermal processing, impregnation with a metal or oxygen scavenger, or combinations thereof.

10. The method of claim 7, wherein the sorbent has a filtrate alkalinity of about 30 mg/L $CaCO_3$ to about 50 mg/L $CaCO_3$.

11. The method of claim 7, wherein the sorbent has a filtrate electrical conductivity of about 5 μS to about 200 μS.

* * * * *